(12) United States Patent
Miyagawa et al.

(10) Patent No.: US 8,408,997 B2
(45) Date of Patent: Apr. 2, 2013

(54) VIDEO GAME WITH FAST FORWARD AND SLOW MOTION FEATURES

(75) Inventors: Yoshiyuki Miyagawa, Tokyo (JP);
Minoru Akao, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 1917 days.

(21) Appl. No.: 10/765,975

(22) Filed: Jan. 29, 2004

(65) Prior Publication Data
US 2004/0204237 A1 Oct. 14, 2004

Related U.S. Application Data

(62) Division of application No. 09/606,212, filed on Jun. 29, 2000, now Pat. No. 6,709,334.

(30) Foreign Application Priority Data

Nov. 17, 1999 (JP) .................................... 11-327552

(51) Int. Cl.
A63F 9/24 (2006.01)
(52) U.S. Cl. ........................................ 463/31
(58) Field of Classification Search ............ 463/31, 463/32
See application file for complete search history.

(56) References Cited

U.S. PATENT DOCUMENTS

| | | | |
|---|---|---|---|
| 4,026,555 A | 5/1977 | Kirschner et al. | |
| 4,114,882 A | 9/1978 | Mau | |
| 4,467,165 A | 8/1984 | Kiuchi et al. | |
| 4,657,247 A | 4/1987 | Okada | |
| 4,679,789 A | 7/1987 | Okada | |
| 5,261,820 A * | 11/1993 | Slye et al. .......................... | 463/1 |
| 5,779,548 A * | 7/1998 | Asai et al. ....................... | 463/31 |
| 6,313,838 B1 * | 11/2001 | Deering ......................... | 345/420 |
| 6,400,361 B2 | 6/2002 | Toffolo | |
| 6,439,998 B1 | 8/2002 | Itou | |
| 2002/0130945 A1 | 9/2002 | Samei et al. | |

FOREIGN PATENT DOCUMENTS

| | | |
|---|---|---|
| JP | 8-161523 | 6/1996 |
| JP | 10-293566 | 11/1998 |
| JP | 10-290550 | 10/1999 |
| JP | 2002-174982 | 6/2002 |
| JP | 2002-208469 | 7/2002 |
| JP | 2002-214962 | 7/2002 |
| JP | 2002-236429 | 8/2002 |
| JP | 2003-17221 | 1/2003 |

OTHER PUBLICATIONS

English Language Abstract of JP 8-161523.
English Language Abstract JP10-293566.
English Language Abstract JP10-290550.
Age of Empires, Microsoft, 1997.
Salt, B., Basic Animation Stand Techniques, 1997, Pergamon Press Inc., pp. 71-74.

(Continued)

*Primary Examiner* — Corbett B Coburn
(74) *Attorney, Agent, or Firm* — Greenblum & Bernstein, P.L.C.

(57) ABSTRACT

Changing a game progress by the operation of a player. A plurality of frame images are sequentially formed and displayed. The frame images are displayed by switching the frame images from a frame buffer. When the frame images are individually formed, the formation time periods of the plurality of frame images are predicted. The game progress made by the frame images is determined in dependence upon the predicted formation time periods of the frame images.

8 Claims, 17 Drawing Sheets

OTHER PUBLICATIONS

White, T., The Animator's Workbook, 1986, Wilton-Guptill Publications, pp. 24-35.

Thomas, F. et al., The Illusion of Life, Disney Animation, 1981, Walt Disney Productions, pp. 285-301.

* cited by examiner

FIG. 14
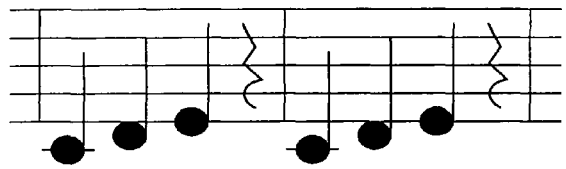
FIG. 15
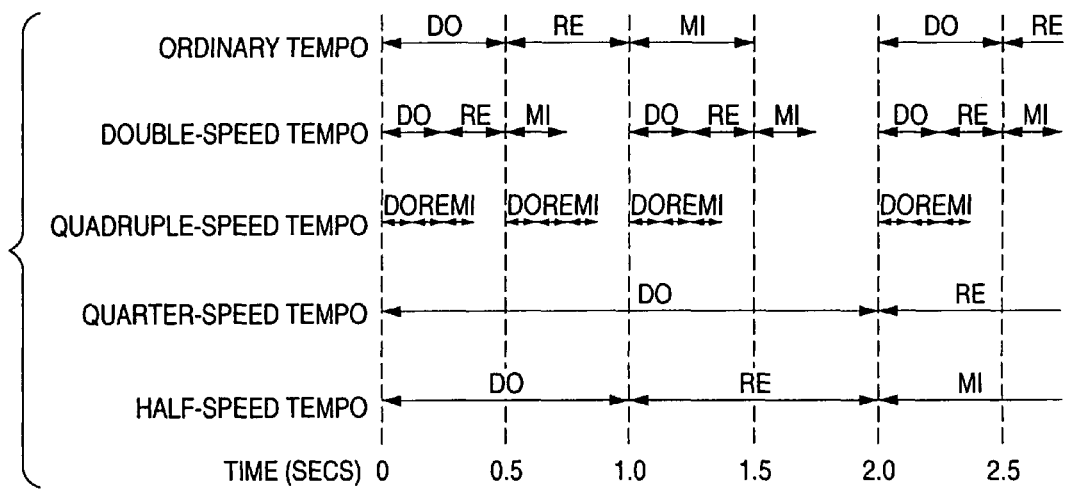
FIG. 16
| NOTES | VOCALIZATION TIME (SECS) | |
|---|---|---|
| | QUARTER NOTE | EIGHTH NOTE |
| ORDINARY TEMPO | 0.500 | 0.250 |
| DOUBLE-SPEED TEMPO | 0.250 | 0.125 |
| QUADRUPLE-SPEED TEMPO | 0.125 | 0.0625 |
| QUARTER-SPEED TEMPO | 2.000 | 1.000 |
| HALF-SPEED TEMPO | 1.000 | 0.500 |

ORDINARY MODE

DOUBLE-SPEED MODE

HALF-SPEED MODE

VIDEO GAME WITH FAST FORWARD AND SLOW MOTION FEATURES

CROSS-REFERENCE TO RELATED APPLICATION

This application is a division of U.S. patent application Ser. No. 09/606,212, filed Jun. 29, 2000, which issued as U.S. Pat. No. 6,709,334 on Mar. 23, 2004, the content of which is incorporated by reference herein in its entirety.

BACKGROUND OF THE INVENTION

1. Field of the Invention

The present invention relates to a recording medium, a game display method and a game display apparatus having a program for forming images constituting a video game.

2. Description of Relevant Materials

In recent years, there have been developed video games employing advanced technologies. In these games, display objects (as will be called the "objects" for simplicity) such as persons, machines, tools, buildings or backgrounds are displayed in a three-dimensional virtual space on the screen.

In the video game, the image forming operations are repeated several tens of times for one second so that still images (as will be called the "frame images") of several frame groups are formed for one second. The group of frame images thus sequentially formed are written alternately in a pair of frame buffers. The frame images thus written are read out from the pair of frame buffers and displayed in a display unit in accordance with a predetermined frame image display period (as may be simply called the "frame period") determined by the display unit.

Of the objects thus displayed, the character imitating a person can also be moved according to the operation of the player. Generally, however, the progressing speed (i.e., the speed at which all the objects on the screen move) of the game on the screen is determined by the game program.

If this progressing speed could be changed according to the taste of the player, it would be expected that the game could be enjoyed in various manners.

According to the content of the game, for example, similar scenes may appear repeatedly many times. If these screens were repeatedly displayed at the same progressing speed, the player would lose interest. As in the quick-advance reproduction function belonging to the VTR (Video Tape Recorder), therefore, there has been desired an image reproduction method in which the progressing speed of the game can be changed by the operation of the player.

SUMMARY OF THE INVENTION

An object of the invention is to provide a game display method, a game display apparatus and a recording medium, which are suited for changing the progressing speed of a video game to a desired value in accordance with the operation input of a player.

In order to achieve the above-specified object, according to an aspect of the invention, there is provided a game display method for a frame display in synchronism with a reference signal produced for a constant period, comprising: inputting a key signal indicating a display speed in response to an operation input; determining the number of frames to be processed between a first reference signal and a second reference signal, as consecutively produced, in accordance with a display speed based on the input key signal; and synchronizing the last frame display when the frame display is made at the determined frame number, with said second reference signal.

According to the game display method of the invention, in response to the operation input of the player, the progressing speed of the game, as displayed on the screen, can be changed to one different from the ordinary game progressing speed.

Specifically, the frame display is synchronized with said second reference signal after at least one frame image can be displayed repeatedly a number of times according to the determined frame number.

Alternatively, the frame display is synchronized with said second reference signal after a number of frame images, based upon the determined frame number, are skipped.

Moreover, the frame display can be synchronized with said second reference signal after frame images generated in response to the operation input are displayed repeatedly a number of times according to the determined frame number and after a number of frame images, based upon the determined frame number, are skipped.

More specifically, the game display method further comprises: adjusting the progressing speed of a musical composition to be output, according to the determined frame number.

According to another aspect of the invention, there is provided a computer readable recording medium having a program recorded for a video game to be executed by a computer for a frame display in synchronism with a reference signal produced for a constant period, wherein said program causes said computer to perform: inputting a key signal indicating a display speed in response to an operation input; determining the number of frames to be processed between a first reference signal and a second reference signal, as consecutively produced, in accordance with a display speed based on the input key signal; and synchronizing the last frame display when the frame display is made at the determined frame number, with said second reference signal.

According to the recording medium of the invention, there is obtained a program by which in response to the operation input of the player, the progressing speed of the game, as displayed on the screen, can be changed to one different from the ordinary game progressing speed.

For example, the frame display is synchronized with said second reference signal after at least one frame image is displayed repeatedly a number of times according to the determined frame number.

Moreover, the frame display can be synchronized with said second reference signal after a number of frame images, based upon the determined frame number, were skipped.

Also, the frame display can be synchronized with said second reference signal after the frame images generated in response to the operation input are displayed repeatedly a number of times according to the determined frame number and after a number of frame images, based upon the determined frame number are skipped.

More specifically, the recording medium further comprises: adjusting the progressing speed of a musical composition to be output, according to the determined frame number.

According to a desired aspect of the invention, there is provided a computer readable recording medium having a program recorded for a video game to be executed by a computer, wherein said program comprises: forming a plurality of frame images constituting the video game sequentially; displaying the plurality of frame images, by switching the frame images from a frame buffer; predicting the formation time periods of said frame images when said frame images are individually formed; determining the game progress to be made by said frame images, in dependence upon the formation time periods of said frame image, as predicted; and changing said determined game progress determined, in response to the operation input by a player.

More specifically, said prediction step predicts one of the formation time periods of said frame images which are expressed in the units of the frame image display period of the shortest period of switching the displays of said frame images at said display step, as the individual formation time periods of said frame images.

According to another desired aspect of the invention, there is provided a computer readable recording medium having a program recorded for a video game to be executed by a computer, wherein said program comprises: forming a group of frame images constituting the video game sequentially; displaying the group of frame images by switching the frame images from a frame buffer; metering the formation time period of each preceding frame image before each of the group of frame images when said frame image just before is formed; determining the game progress to be made by said frame image, in dependence upon the formation time periods of said preceding frame image, as metered when the group of frame images are individually formed; and changing said determined game progress, in response to the operation input by a player.

According to still another desired aspect of the invention, there is provided a computer readable recording medium having a program recorded for a video game to be executed by a computer, wherein said program comprises: forming a group of frame images constituting the video game, sequentially in synchronism with the ends of the formations of the individually preceding frame images; displaying the group of formed frame images, such that the group of frame images formed by said formation step may be switched from a frame buffer and displayed after one of the individual formation ends of the group of frame images in synchronism with a predetermined clock signal having a frame image display period of the shortest time period for switching the displays of the group of frame images; predicting the formation time periods of the group of frame images when said frame images are individually formed; determining the game progress to be made by said frame images, in dependence upon the formation time periods of said frame images, as predicted; and changing said determined game progress, in response to the operation input by a player.

More desirably, the formation of a next frame image begins after finishing formation of the group of frame images in synchronism with said clock signal.

According to a further aspect of the invention, there is provided a game display apparatus, comprising: a computer-readable recording medium recorded with a program for processing a frame display in synchronism with a reference signal produced for a constant period; a computer for reading and executing at least one portion of the program from said recording medium; and a display for displaying a video game to be realized by said program, wherein said computer reads said at least one portion of the program from said recording medium, and wherein said computer, in executing said at least one portion of the program from said recording medium: receives an input of a key signal indicating a display speed in response to an operation input; determines the number of frames to be processed between a first reference signal and a second reference signal, as consecutively produced, in accordance with a display speed based on the key signal input[ted] by said controller; and synchronizes the last frame display when the frame display is made at the frame number determined by the processing unit with said second reference signal.

According to the game display apparatus of the invention, the progressing speed of the game on the screen can be changed in response to the operation input of the player.

The present disclosure relates to subject matter contained in Japanese Patent Application No. HEI 11-327552, filed on Nov. 17, 1999, the disclosure of which is expressly incorporated herein by reference in its entirety.

BRIEF DESCRIPTION OF THE DRAWINGS

FIG. 14 is one example of a musical score for explaining a play of a music in a video game to which the invention is applied;

FIG. 15 is a diagram conceptually showing vocalization time periods in different modes of a note in the device of FIG. 1;

FIG. 16 is a diagram conceptually showing vocalization time periods in different modes of several notes in the device of FIG. 1;

DETAILED DESCRIPTION OF THE PREFERRED EMBODIMENTS

The game display method according to the invention, the program recording medium and the game display apparatus using the method will be described in detail in connection with their several embodiments with reference to the accompanying drawings.

Embodiment 1 of the Invention

Figure 1:
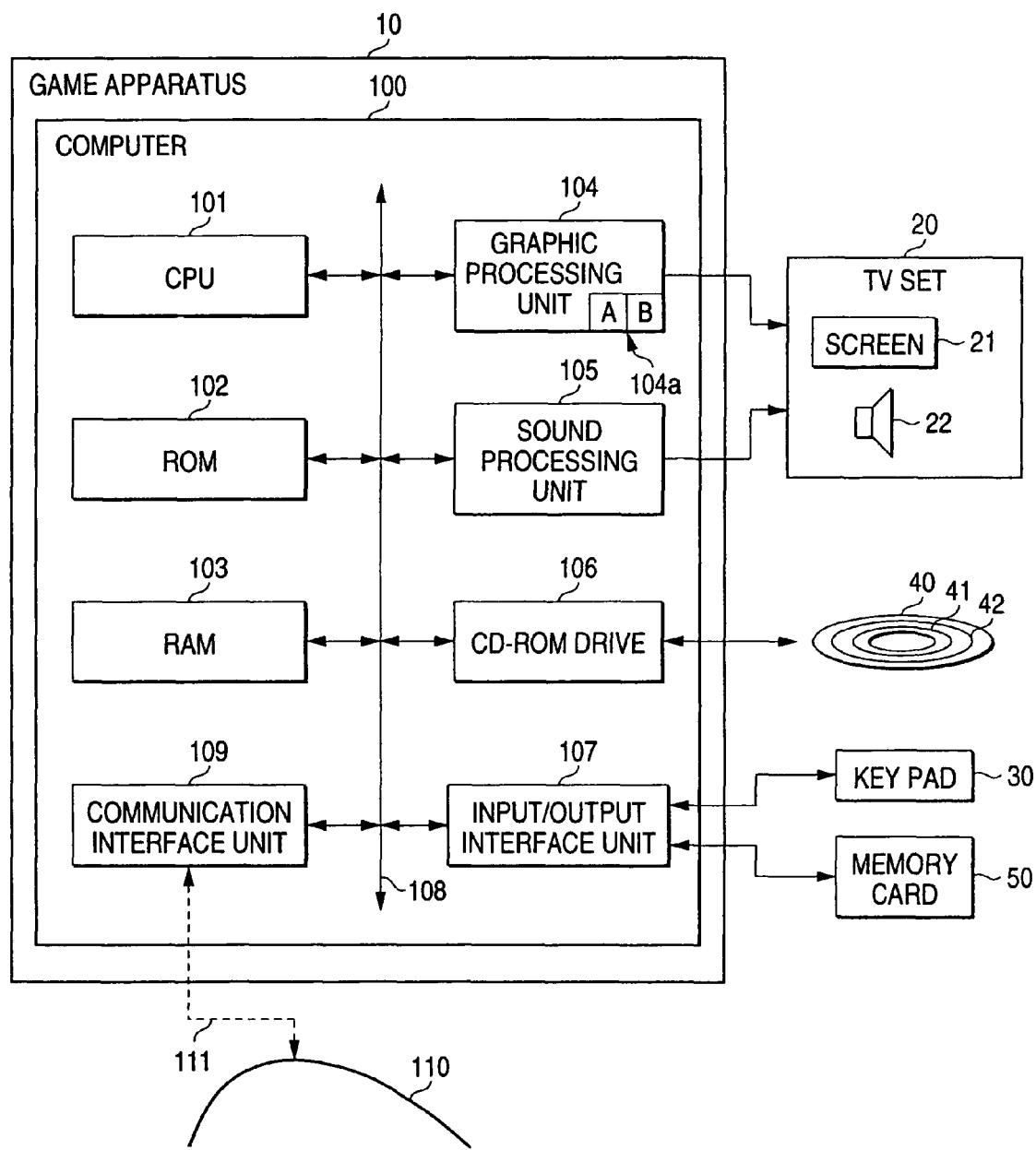
FIG. 1 is a schematic diagram showing a game system using a computer-packaged game device according to the invention.

As shown in FIG. 1, a game system 1 is constructed to include: a game device 10 capable of being removably loaded with a CD-ROM (Compact Disk—Read Only Memory) 40 having a computer game program 41 recorded therein according to the invention, for example; a display apparatus 20; and a input device 30 capable of being operated by the player. The game device 10 is a household game device including a computer 100 confined in a casing so that the player loads the game device with the CD-ROM 40, for example, by pushing the (not-shown) open button on the game device 10 to open the (not-shown) closed cover. The game device 10 starts to execute the computer game program recorded in that CD-ROM 40. The display apparatus (television set) 20 and the input device 30 are connected with the game device 10 through cables.

This game device 10 is provided with the (not-shown) card slot. Into this card slot, there can be inserted a memory card 50 or an external auxiliary recording medium. The player is arbitrarily enabled to store the memory card 50 inserted into the card slot, with the data for reopening the game such as data on the player character and the enemy character or data on the progressing situations of the game program. When the player opens again the game by using the memory card 50, the game device 10 reopens the game from the interrupted portion.

The display apparatus 20 receives video signals and audio signals from the game device 10. The display apparatus 20 displays the image by processing the video signals received and outputs the sounds according to the audio signals received from a speaker 22 belonging to the display apparatus 20. This display apparatus 20 is constructed of a TV receiver, for example.

The input device 30 is generally called the "controller" and is equipped with a group of buttons and other (not-shown) control portions for the player to operate. For example, the input device is equipped with a direction key group composed of four direction keys for moving a cursor on the screen 21 leftward, rightward, upward or downward, a select button, a start button, a first button, a second button, a third button and a fourth button. However, the game system to which the invention is applied should not be limited to the shown one or any similar game systems.

The computer 100 is constructed, for example, to include: a central processing unit (CPU) 101; a read only memory (ROM) 102 stored with a string of instructions and data necessary for the CPU 101 to execute the program instructions; a random access memory (RAM) 103 constituting a main memory for temporarily storing the game program to be executed and the data to be used by the game program; a graphic processing unit 104; a sound processing unit 105; a CD-ROM drive 106 to be loaded with the CD-ROM 40; an input/output interface unit 107; a communication interface unit 109; and a bus 108 for connecting the circuit components enumerated.

The CPU 101 decodes the program instruction stored in the RAM 103 to control the individual circuits in the computer in accordance with the decoded instruction, and controls the execution of the game program so that the program portion corresponding to the operation input of the player, as input through the input/output interface unit 107 from the input device 30, may be executed in response to that operation input. The CPU 101 executes the instruction string stored in the ROM 102 when it executes the program instruction.

The graphic processing unit 104 includes the not-shown video RAM (VRAM) to construct the (not-shown) frame buffer and draws an image or the like composed of polygons expressing an object, on the frame buffer in response to the instruction given from the CPU 101. Moreover, the graphic processing unit 104 produces video signals such as TV signals according to the image information stored in the frame buffer, and outputs them to the not-shown video circuit in the display apparatus 20.

The frame buffer is composed of a pair 104a of frame buffers (A, B) so that object images forming a common frame image are stored in one (A) of the paired frame buffers 104a. When the formation of one frame image is ended, a next frame image is stored in the other (B) of the paired frame buffers 104a. Thus, frame images are alternately stored in the paired frame buffers 104a.

From the other frame buffer paired with the frame buffer storing the frame image, there is read the frame image which has been recently stored therein. The frame buffers 104a to be read are switched in synchronism with the vertical synchronizing signal of the display apparatus 20, and a new frame image is also formed in synchronism with the same signal. The period of the vertical synchronizing signal is a frame image displaying period (or a frame period). It should also be noted that in each relevant embodiment described herein, the shortest period of switching the displays of said frame images when displaying the frame images is the period of the vertical synchronizing signal (e.g., wherein a prediction step predicts, as the individual formation time periods of said frame images, a formation time period in units of the period of the vertical synchronizing signal).

On the basis of the sound data stored in the RAM 103, the sound processing unit 105 produces sound signals indicating a voice, a musical composition, an effect sound and so on and feeds the signals to the speaker 22 through the not-shown audio circuit in the display apparatus 20.

The input/output interface unit 107 is connected with the input device 30 and the memory card 50 inserted into the (not-shown) card slot, and controls the timings of data transfers between these components and the CPU 101 and other circuits. Here, it is needless to say that the computer constituting the game device according to the invention should not be limited to the shown computer or any similar computers.

The CD-ROM 40 is a recording medium for recording the game program 41 and data 42 to be used by the game program 41. The CD-ROM drive 106 reads the game program 41 together with the data 42 and stores them in the RAM 103 so that the[se] program and data may be executed by the CPU 101. The game program 41 and the data 42 to be used in the present game device can be provided by another method. In this method, for example, the game program 41 is carried by carrier waves used for communications so that it may be transmitted as computer data signals to be executed by the computer and may be received on the side of the game device.

For example, the game program may be downloaded through the communication interface unit 109 from another not-shown device on a network 110 connected via a communication line 111 and may be used in the game device 10. Alternatively, the game program and the data may be stored in advance in another device on the network 110 connected via the communication line 111 and may be sequentially stored for use, if necessary, in the RAM 103 via the communication line 111. Here, the game device 10 may be constructed such that only one of such alternative modes or the use of the CD-ROM can be supported.

The game program is executed by the CPU 101 suitably using the remaining circuits in the computer 100 so that the various functions intended by the game program can be realized. These functions include: a forming function to form the frame image; a display function to feed the formed frame image to the display apparatus and display it; a function to change the game program of the frame screen formed; and a function to skip the formation of the frame image.

Figure 2:
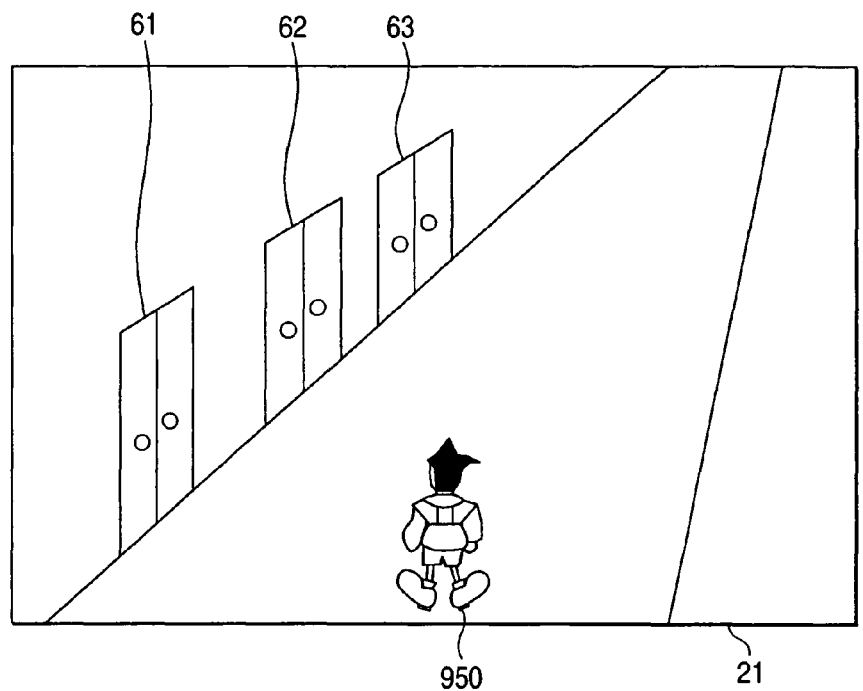
FIG. 2 is a diagram schematically showing one game image displayed by a game program.

FIG. 2 is a diagram schematically showing one game image to be displayed by the game program executed in the game device. As one frame image belonging to one scene, there is shown in the screen 21 a pattern in which a player character 950 positioned in a three-dimensional virtual space is walking in a corridor in a building. This corridor is provided in its side wall with several doors 61, 62 and 63.

The player is enabled by operating the input device 30 (FIG. 1) to control the position and the moving direction of the player character 950. The player character 950 can further advance on the corridor and can advance to any door and open it. As the movement of the player character 950 is continuously instructed by the player, the position of the player character 950 is continuously changed on the screen.

When similar screens appear several times in the game, however, the player desires to farther advance on the corridor without opening the doors on the way. At this time, the player may desire the player character 950 to walk faster than the ordinary speed.

Figure 3:
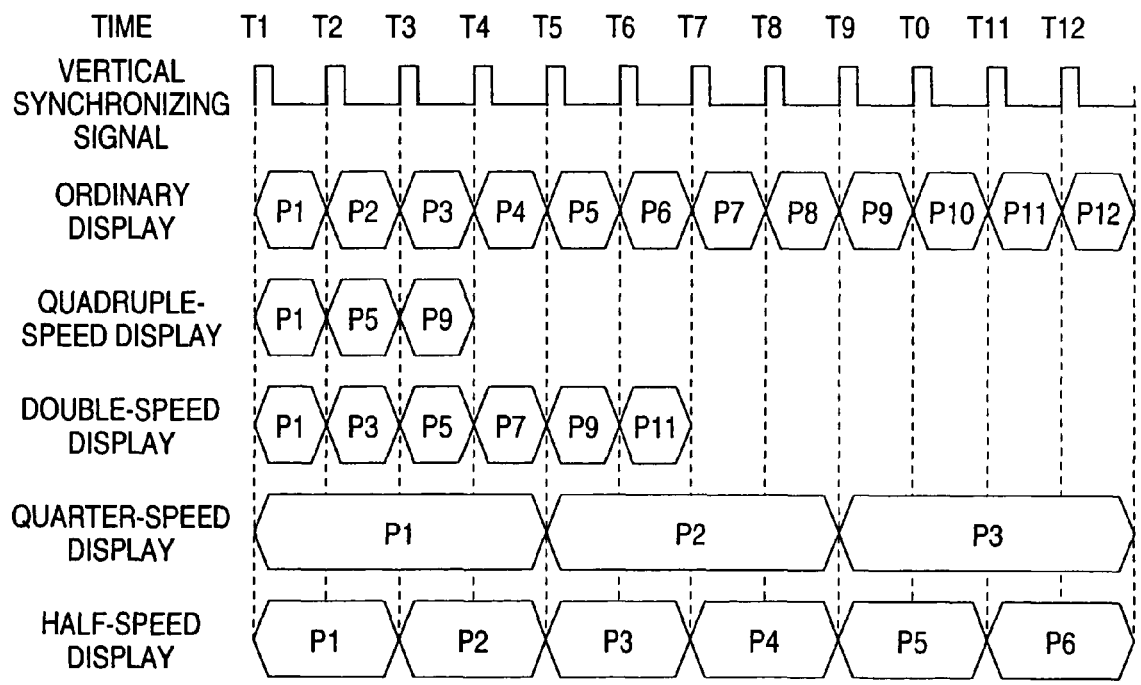
FIG. 3 is a schematic time chart for explaining the formation and display of a frame image in the game device.

In the invention, therefore, a key signal indicating a display rate is input in response to the operation of the player. On the basis of the key signal, the progressing speed of the game can be changed. In this embodiment, as illustrated in FIG. 3, in the case of a game of an ordinary mode in which frame images P1, P2, P3, - - -, and P12 are switched for one frame period and displayed, the frame images P1, P5, P9, - - -, and so on are sequentially formed and displayed in a high-speed mode when the game is displayed at a speed of four times as high as that of the ordinary mode. When the game is displayed at a double speed of that of the ordinary mode, the frame images P1, P3, P5, P7, P9, P11, - - -, and so on are sequentially formed and displayed.

As a result, the game changes four or two times as quickly as the ordinary one on the screen. At the quadruple speed, more specifically, the frame image, as would be displayed in the ordinary mode four frame periods after from the preceding one, is displayed as the frame image to be subsequently displayed. Thus in the high-speed mode, the game progress of each frame image is increased. When the game is to be displayed at the quadruple speed, more specifically, four frames are processed between two consecutively produced vertical synchronizing signals. Moreover, the last image of the processed four frames is displayed in the screen.

Figure 4:
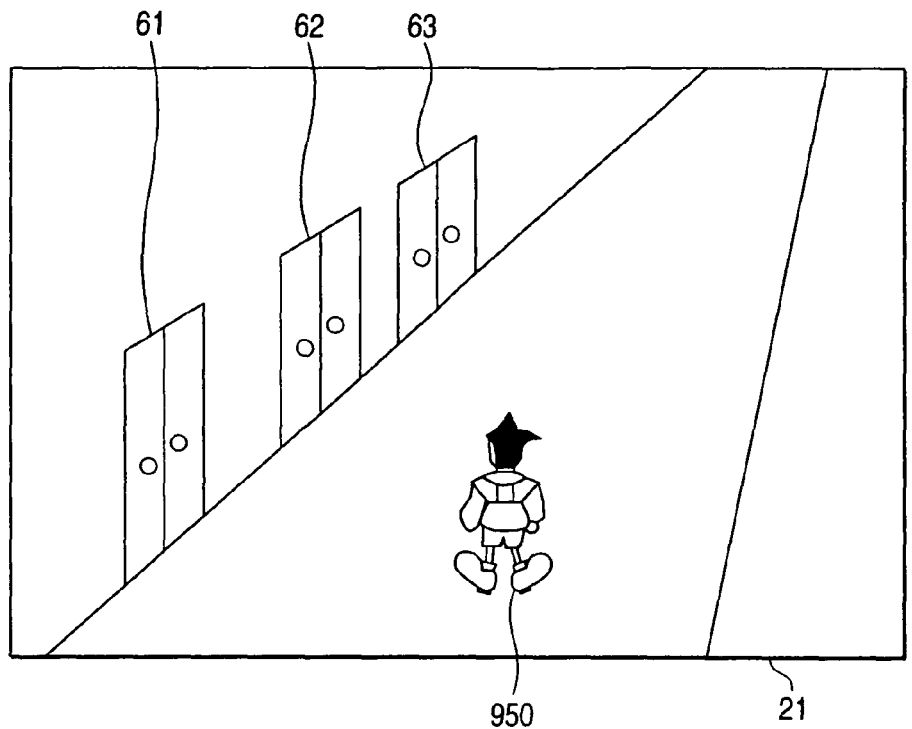
FIG. 4 is a diagram schematically showing another game image displayed by a game program.

If the image presented in FIG. 2 is assumed to be the frame image P1, for example, the next frame image P2 indicates that the player character 950 has slightly advanced on the corridor, as exemplified in FIG. 4. In the ordinary mode, the frame image P2 is displayed for the next frame period of the frame image P1. In the high-speed mode of the four times, however, the frame image P5 is formed and displayed subsequent to the frame image P1.

Figure 5:
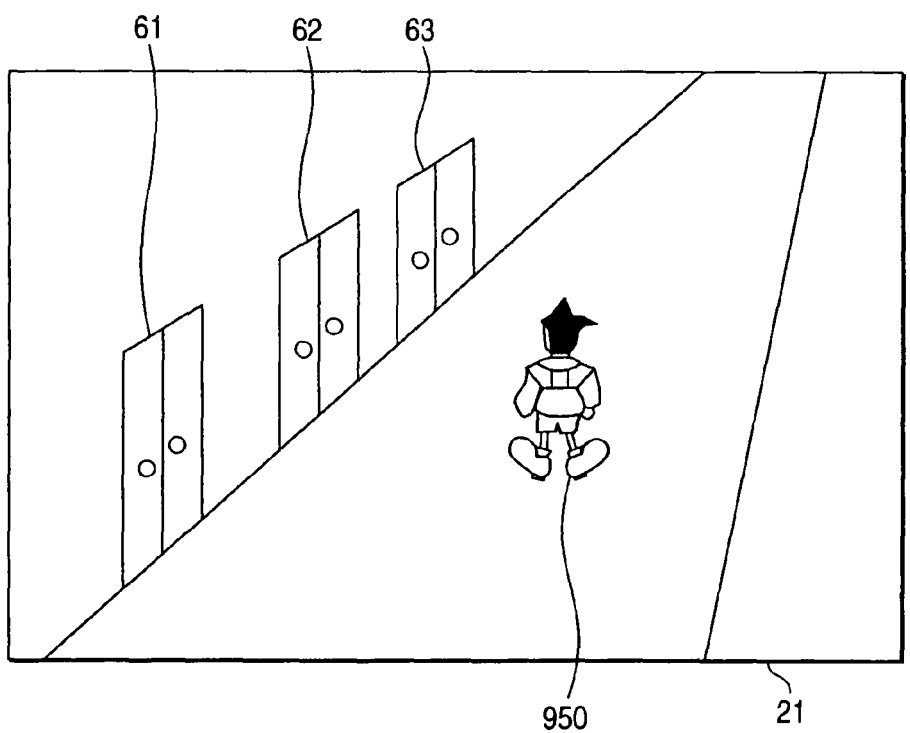
FIG. 5 is a diagram schematically showing still another game image displayed by a game program.

The frame image P5 indicates that the player character 950 has further advanced on the corridor, as exemplified in FIG. 5. In the high-speed mode of the four times, the displayed image abruptly changes from the image of FIG. 2 to the image of FIG. 5 so that the progress of the game is sped up.

In the low-speed mode, e.g., at the quarter-speed speed, each frame image such as P1 is displayed repeatedly four times, and the next frame image such as P2 is then displayed. Thus, the display period of the frame image is elongated by four times as long as that of the ordinary mode. In the case of the half-speed speed, each frame image such as P1 is displayed repeatedly two times, and the next frame image such as P2 is then displayed. Thus, the display period of the frame image is elongated by two times as long as that of the ordinary mode.

In this low-speed mode such as in the case of the quarter speed, as will be described later, when each frame image is formed, the image formation is skipped for the subsequent three frame periods. As a result, the frame image formed just before is continuously displayed. When each frame image is formed in the case of the half-speed, the image formation is skipped for the subsequent two frame periods. As a result, the frame image formed just before is continuously displayed.

Figure 6:
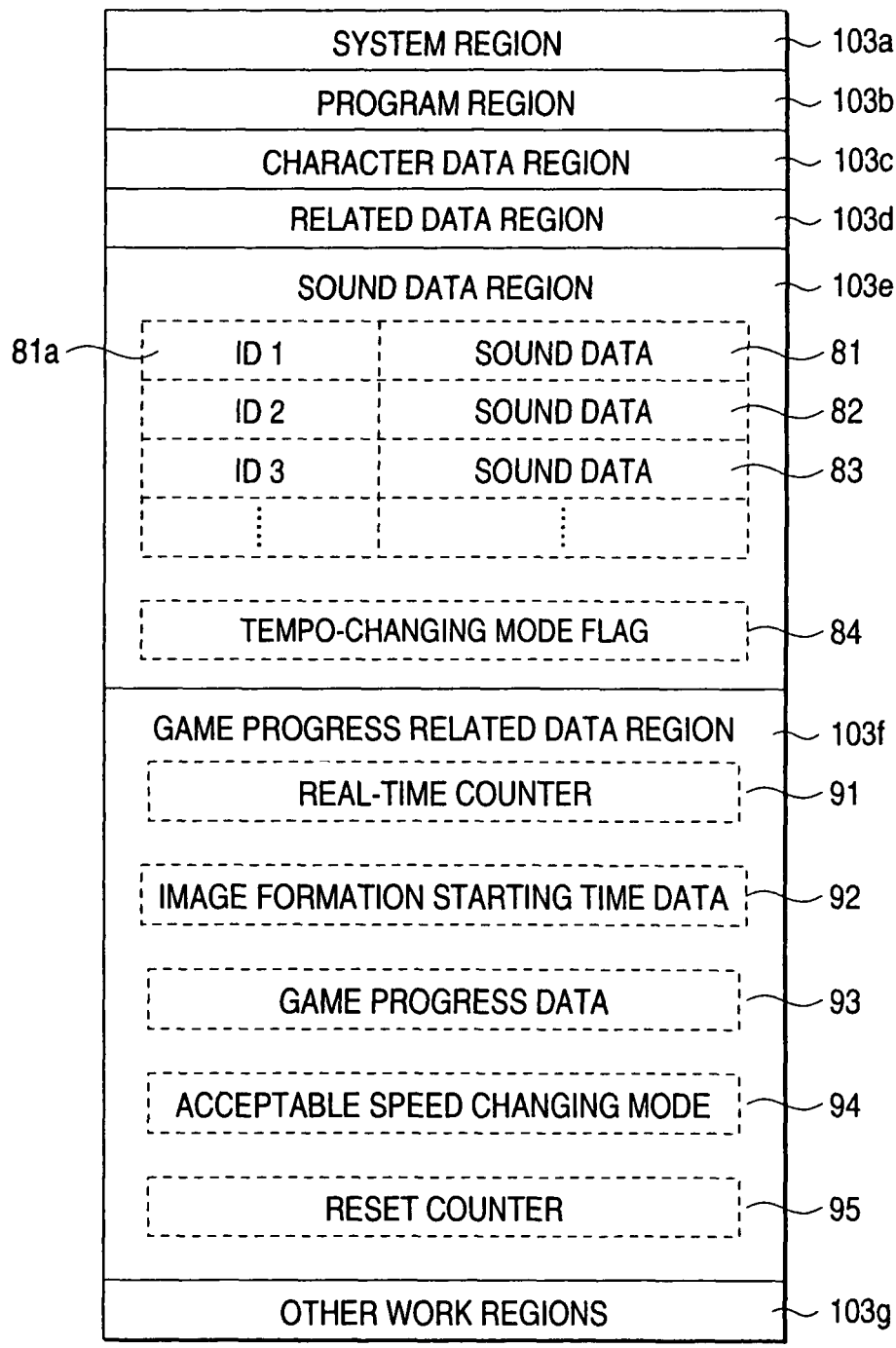
FIG. 6 is one example of a memory map of a RAM in the computer contained in the game device.

Now, the RAM 103 is used at the time of executing the game program, for example, in accordance with the memory map shown in FIG. 6. A system region 103*a* is stored with system information such as an interruption vector indicating the jumping destination of an interruption routine. A program region 103*b* is stored with the portion being executed of the game program. A character data region 103*c* is stored with data on a group of characters to appear in the game, such as the player character and the enemy character.

A related data region 103*d* is stored with other related data to be used for executing the game program such as the motion data of the individual characters. However, these related data have no direct relation to the invention so that their description is omitted.

A sound data region 103*e* is stored with data for producing sounds during the advance of the game. Here are stored musical sound data 81, 82 and 83. Each of the sound data is designated by an identifier 81*a*. This region 103*e* is also stored with a tempo-changing mode flag 84. This flag indicates the tempo-changing mode when a musical composition is to be reproduced, and takes any of five values (2, 1, 0, −1, −2), as will be described later.

A game progress related data region 103*f* is stored with data for executing the game display method according to the invention. There are stored a real-time counter 91, image formation starting time data 92, game progress data 93, an acceptable speed-changing bit 94 and a reset counter 95, for example.

The real-time counter 91 is a counter for expressing a real time in the game progress. In the embodiment, the real time is expressed in terms of the number of vertical synchronizing signals produced by the display apparatus 20 (FIG. 1), as will be described later. That is to say, the real-time counter 91 expresses the real time at the unit of frame period. In other words, the real-time counter 91 expresses the real time in terms of the ratio between the real time and the frame period. The real-time counter 91 is incremented by 1 each time the vertical synchronizing signal is produced.

The image formation starting time data 92 express the time at which the formation of the frame image is started. In this embodiment, this time is also expressed in terms of the number of vertical synchronizing signals. In this embodiment, the formation of the frame image is started in synchronism with the vertical synchronizing signal. Therefore, the image formation starting time data 92 indicate what vertical synchronizing signal the frame image is really formed at.

The game progress data 93 are data characterizing this embodiment, and indicate the game progress that the frame image to be formed should have with respect to the immediately preceding frame image. In this embodiment, the game progress data 93 are so determined as to express how many times as long as the game progress to be made by the frame image to be formed is with respect to the ordinary game progress in one frame period imaged by the game program for the frame image. In short, the number of frames to be processed between two consecutively produced vertical synchronizing signals is determined in terms of the value set to the game progress data.

The real-time counter 91 and the image formation starting time data 92 could be expressed by another time unit such as seconds. If the method for expressing those data at the unit of the vertical synchronizing signal is used as in this embodiment, however, the time period for forming the frame image is determined from the difference between the real-time counter 91 and the image formation starting time data 92. An advantage is that the difference can be used as it is as the game progress data 93.

The acceptable speed-changing mode bit 94 is a bit for designating the kinds of acceptable speed changes. Here it is assumed that the quadruple speed and the quarter speed are employed when the acceptable speed-changing mode bit 94 is at 1, and that the double speed and the half speed are employed when the same bit is at 0.

The double speed is employed when sequential (even in the ordinary mode) images have dramatically changing contents, like a series of images indicating patterns where the character is fighting against the enemy character. This is because the double-speed display can provide easily viewable images, when the high-speed mode is instructed by the operation of the player while those images are being continuously displayed. The half speed can also be employed for the game screen for which the double speed can be employed.

The quadruple speed is employed when sequential images do not have dramatically changing contents, like a series of images indicating patterns where the character is walking in a town. This is because even the quadruple-speed display will not change the screen excessively fast, when the high-speed mode is instructed by the operation of the player while those images are being continuously displayed. The quarter speed can also be employed for the game screen for which the quadruple speed can be employed.

The acceptable speed-changing mode bit 94 is suitably changed by the game program in the procedure of the game especially at a scene changing time in response to any of the aforementioned kinds of images to be displayed in the scene.

The reset counter 95 counts the number of times at which the game progress data 93 are reset so that the frame image may not be formed at the low-speed mode, as will be described later.

Other work regions 103g are employed as work regions for retaining other data temporarily when the game program is executed.

Figure 7:
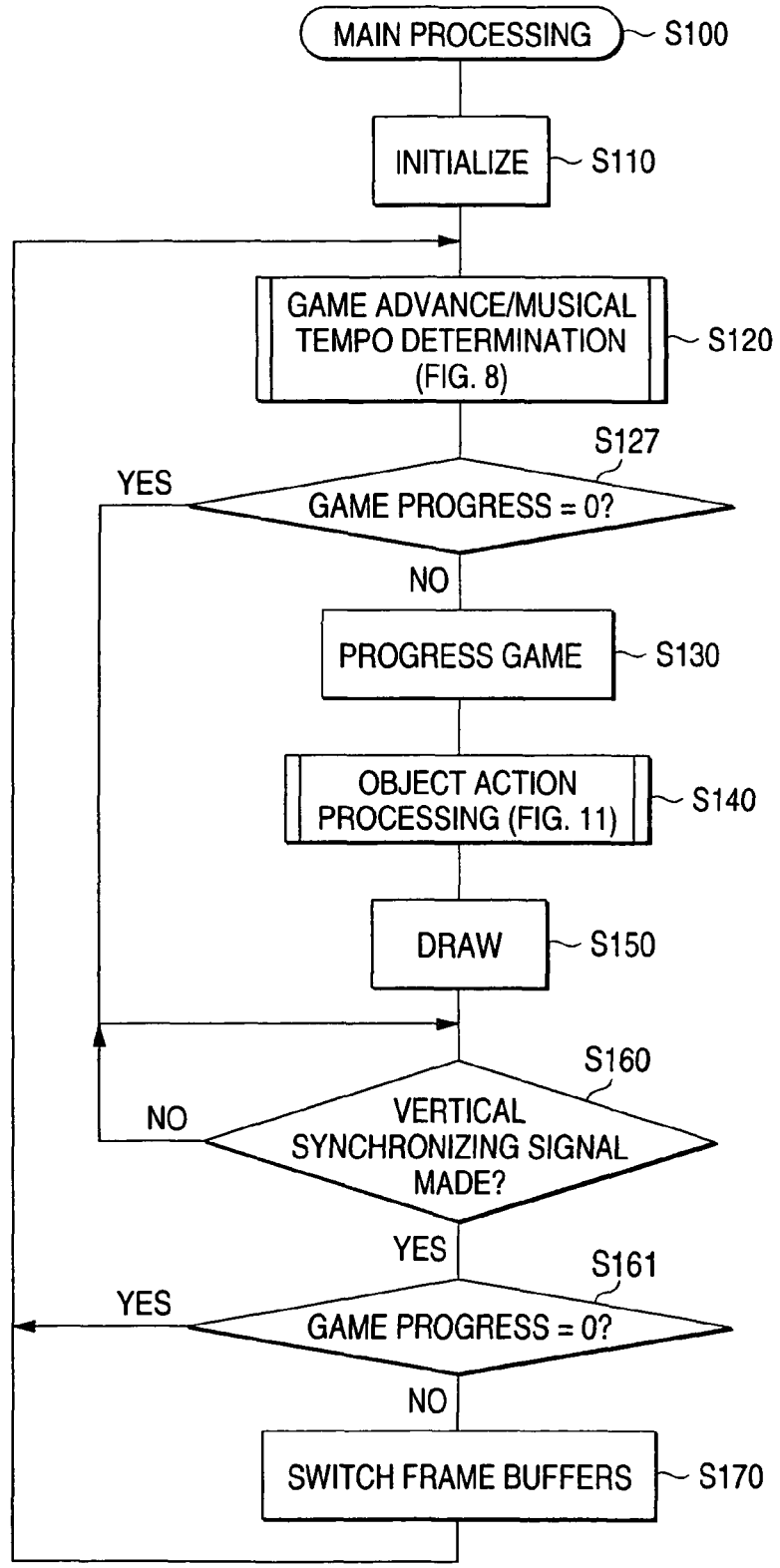
FIG. 7 is a schematic flow chart of the main processing of a game program to be suitably executed in the game device.

The game program to be executed in this embodiment is composed of an initialization for setting the initial data in the RAM 103, and a main processing for controlling the progress of the game and for forming and displaying the game screen. FIG. 7 shows one example of the main processing routine S100.

Before entering into the description of the main processing routine S100, here will be schematically described the principle of this embodiment. The changes in the position and direction of each object between a pair of adjacent frame images are predetermined in dependence upon the game progressing speed. In other words, in order to form a frame image, the individual positions and directions of a group of objects composing the frame image are predetermined according to the position and direction of the same object in the frame image just before and to a distance for the object to be moved between those frame images.

The distance for each object to be moved for one frame period is determined at each time in the procedure of the game program on the basis of the game progressing speed. Naturally, the movement changes with the inputting of the player. With a player's operation input of the game progressing speed, moreover, the game program may change on the basis of the operation. Since the game program determines the movement of each object on the basis of the operation input of the player, however, it can be considered that the game program, including the influences of the operation input by the player, determines the movement of each object.

With the large movement of each object, the game progresses quickly on the screen. Therefore, this movement can be said to be the game progress between each frame image and the preceding frame image.

When two (2) or more frame periods are required to form a frame image, i.e., when the frame image forming time period is shorter than N frame periods (wherein N is an integer larger than 1) but longer than (N−1) frame periods, the frame image forming time period will be called the "N-frame period", unless otherwise specified. In other words, when the frame image forming time period is mentioned in comparison with the frame period or when the frame image forming time period is metered at the unit of the frame period, the frame image time forming period is expressed as the least number of frame periods capable of including the forming time period of the frame image.

When the time periods for forming a group of consecutive frame images are all one frame period, the frame images are sequentially fed for one frame period to the display apparatus so that they are displayed by switching them for one frame period. In the ordinary mode, therefore, the game will progress on the screen at the speed estimated by the game program if the game progress between each frame image and the frame image just before is equal to that for the one frame period estimated by the game program.

When the game image is to be changed in response to the operation input of the player at a higher progressing speed than that estimated by the game program, the game progress between each frame image and the frame image just before is made larger than that, as estimated by the game program, for one frame period. When the game progressing speed of the N times (where N is an integer larger than 1) of the ordinary game progressing speed is to be realized, more specifically, the game progress of each frame image is made N times as large as that, as estimated by the game program, for one frame period. This value N is set to 4 or 2 according to the kind of the frame image to be formed.

The game progress of each frame image is easily enlarged so that a speed as high as the double or quadruple speed is easily realized according to this method.

In this embodiment, the game progress of the frame images are determined when the frame images are formed. Specifically, the game progress of each frame image is determined when the frame image is formed. This game progress is determined in proportion to the formation time period of the frame image. In this embodiment, the formation time period of each frame image is one frame period. In the ordinary mode, therefore, the game progress of each frame image is so determined as to be equal to the progress estimated by the video game.

When a specific operation input for realizing the game progressing speed of N times is given by the player, the game progress of the frame image to be formed is changed to the N times only while the operation input is given.

When the specific operation input for realizing a game progressing speed lower than that of the ordinary mode is given by the player, the game progress of each frame image is equalized in this embodiment to that for one frame period for which the operation is being input, and the formation period of the frame image is made longer than that of the ordinary mode. When the game progressing speed of one N-th of the ordinary game progress speed is to be realized, for example, the formation period of the consecutive frame images is changed to one N-th.

In this embodiment, more specifically, one frame image is formed while the N frame images are being formed. In the remaining period, the formation of the frame images is skipped. This N value is set to 4 or 2 according to the kind of the frame image to be formed.

Now, an initialization S110 is executed at a suitable timing after the start of the execution of the main processing routine S100. First of all, the image formation starting time data 92 (FIG. 6) are set to an initial value 0. The tempo-changing mode flag 84 (FIG. 6) and the reset counter 95 (FIG. 6) are also set to 0. The value 0 of the tempo-changing mode flag 84 indicates that a musical composition should be played at an ordinary tempo. The acceptable speed-changing mode bit 94 (FIG. 6) is set to 1. This value 1 of the acceptable speed-changing mode bit 94 indicates that the quadruple speed and the quarter speed can be employed.

After this, the real-time counter 91 is forcibly initialized to 1. This initialization is made awaiting the production of a new vertical synchronizing signal after the image formation starting time data 92. The initial value 0 of the image formation starting time data 92 and the initial value 1 of the real-time counter 91 are so selected that the game progress data 93 to be determined a game progress/musical tempo determination S120 to be described may have the initial value 1. Therefore, the real-time counter 91 and the image formation starting time data 92 can have other values.

Figure 8:
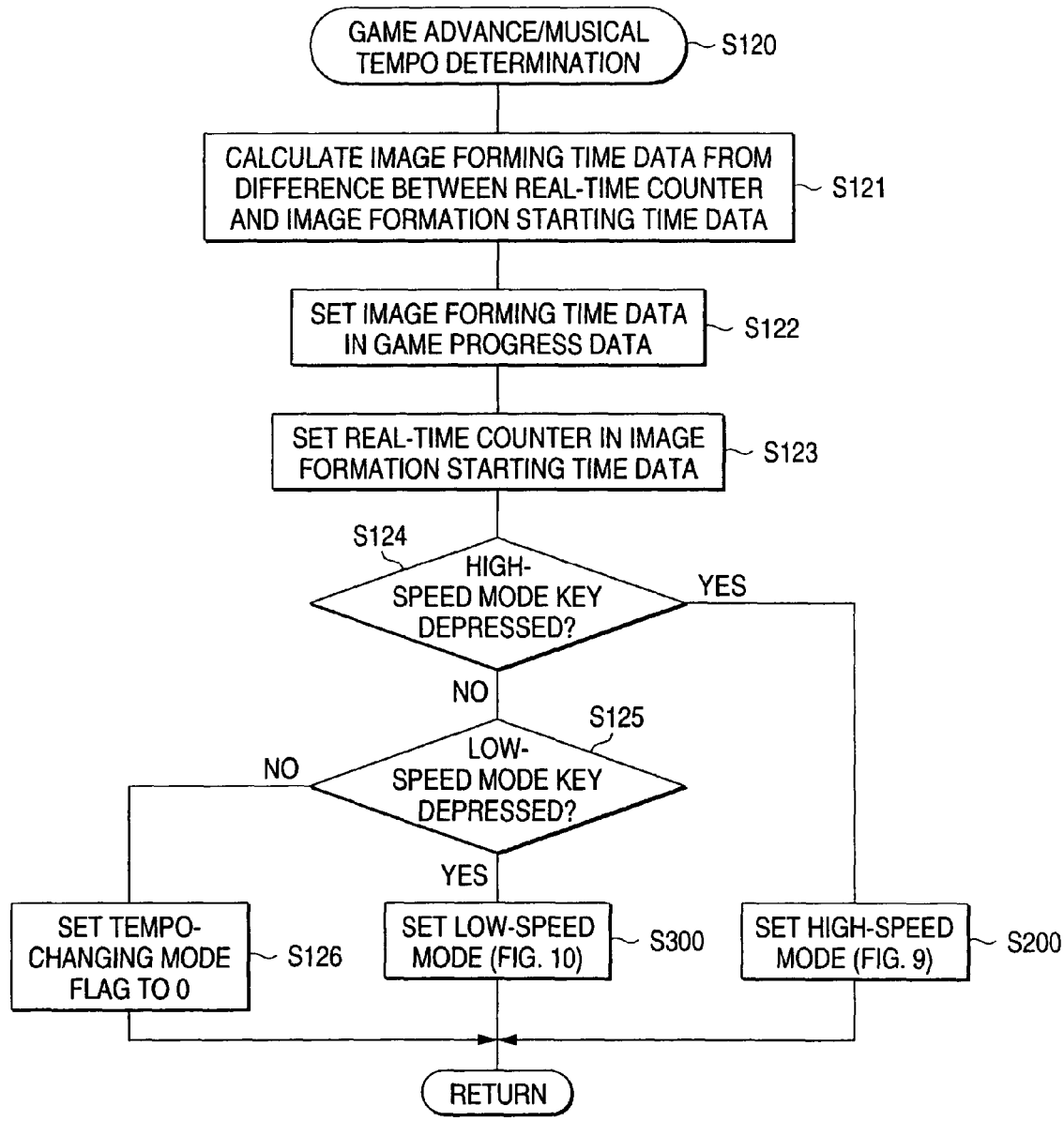
FIG. 8 is a schematic flow chart of a game progress/a musical tempo determination contained in the main processing.

The main processing routine S100 executes a series of following steps for forming each frame image. The game progress/musical tempo determination S120 is to determine the game progress and the musical tempo to be owned by the frame image to be formed next, at the time of forming the frame image. At the game progress/musical tempo determination S120, as shown in FIG. 8, the difference between the image formation starting time data 92 and the real-time counter 91 is calculated at first. As a result, the time period for forming the frame image just before is metered (at step S121).

When the game progress/musical tempo determination S120 is executed at first after the start of the main processing routine S100, the values of the real-time counter 91 and the image formation starting time data 92 are equal to the initial values 1 and 0, respectively. It is, therefore, assumed that no frame image is formed just before the frame image formed at first in the main processing routine S100, but that the time period for forming the immediately preceding frame image is one frame period.

The formation time period thus metered is set (at step S122) as-is in the game progress data 93 (FIG. 6). Therefore, the game progress data 93 of the frame image to be formed at first has the value 1. After step S121, the value of the real-time counter 91 is set (at step S123) in the image formation starting time data 92. The value of this real-time counter 91 indicates the time of the formation start of the frame image to be formed.

The real-time counter 91 counts the number of the vertical synchronizing signals produced, as has been described before. Therefore, the real-time counter 91 meters the real time at the frame period unit. The image formation starting time data 92 are determined at step S123 by using the content of the real-time counter 91, and also express the formation starting time of the next frame image at the frame period unit.

Therefore, the formation time of the frame image metered at step S121 is also expressed at the frame period unit. Specifically, the formation time period metered indicates how many times as long the formation time period of the preceding frame image is with respect to the frame period.

In this embodiment, the formation time period is employed as-is in the game progress data 93. When the game progress data 93 have a value M (where M is an integer no less than 0), the frame image is so formed that the game progress of the frame image to be formed is a game progress between the M frame periods estimated by the game program, as will be described in the following. Therefore, the game progress data 93 have a value indicating how many times as long the game progress of the frame image to be formed is with respect to the game progress estimated by the game program for that frame image.

In this embodiment, the formation time period of each frame image is assumed to be one frame period, and the game progress data may always be set at 1 in place of the foregoing steps S121 to 123. However, these steps are provided for applying this embodiment to the case in which the formation time period of each frame image is longer than the frame period. The case in which the formation time period of the frame image is longer than the frame period will be described in connection with second and third embodiments.

It is then decided (at step S124) whether or not a key for instructing the high-speed mode (as will be called the "high-speed mode key") is depressed by the player. When this high-speed mode key is depressed, a key signal indicating the high-speed mode is input from the input device 30. This decision is made by deciding the key signal. This key can be exemplified by a suitable key disposed in the input device 30 (FIG. 1), such as a key called the "R2 key" in some game devices. When the high-speed mode key is depressed, a high-speed mode setting routine S200 is executed.

Figure 9:
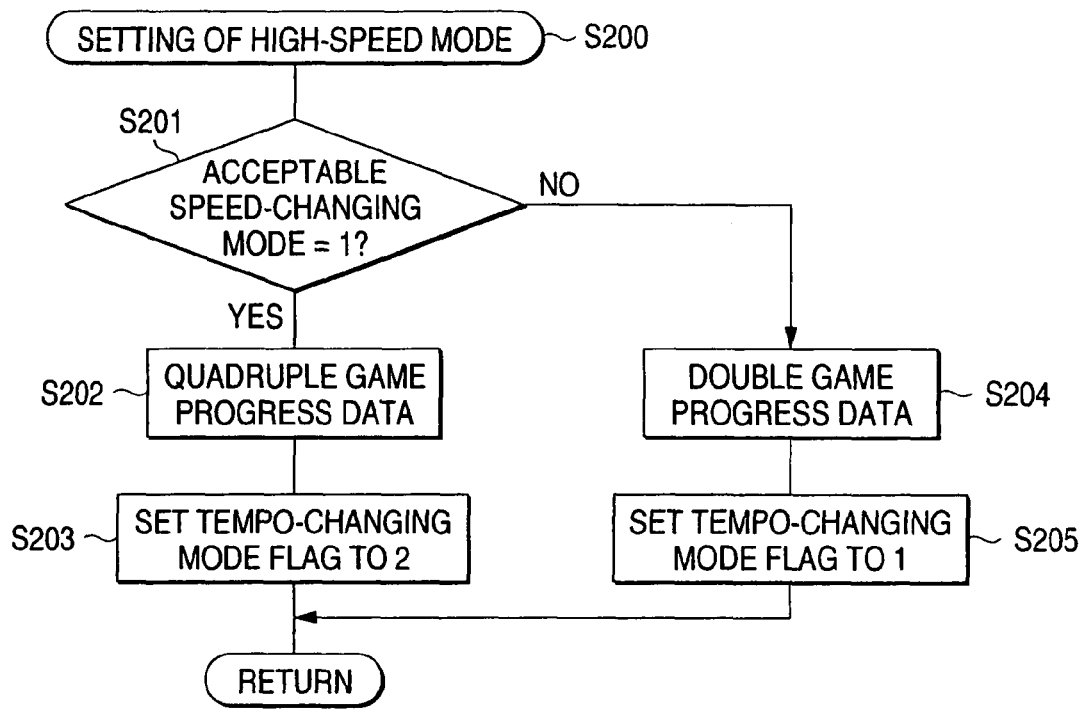
FIG. 9 is a schematic flow chart of a high-speed mode setting to be executed in the game progress/musical tempo determination.

In the high-speed mode setting routine S200, as shown in FIG. 9, it is decided (at step S201) whether the acceptable speed-changing mode bit 94 is at 1 or 0. When the acceptable speed-changing mode bit 94 is at 1, the quadruple speed can be utilized so that the value of the game progress data 93 (FIG. 6) is changed (at step S202) to the quadruple value (e.g., 4). Moreover, the tempo-changing mode flag 84 (FIG. 6) is changed to 2 (at step S203). This value 2 indicates that the musical composition should be played at a tempo that is four times as high as the ordinary tempo.

When the acceptable speed-changing mode bit 94 is decided to be 0 at step S201, the double speed can be utilized so that the value of the game progress data 93 (FIG. 6) are changed (at step S204) to the double value (e.g., 2). Moreover, the tempo-changing mode flag 84 (FIG. 6) is changed to 1 (at step S205). This value 1 indicates that the musical composition should be played at a tempo that is two times as fast as the ordinary [one] tempo.

Reverting to FIG. 8, when the high-speed mode key is not depressed, it is decided (at step S125) whether or not the key for instructing the low-speed mode (as will be called the "low-speed mode key") is depressed. When this low-speed mode key is depressed, a key signal indicating the low-speed mode is input from the input device 30. This decision is made by decoding the key signal. This key can be exemplified by a suitable key disposed in the input device 30 (FIG. 1), such as a key called the "L2 key" in some game devices. When the low-speed mode key is depressed, a low-speed mode setting routine S300 is executed.

Figure 10:
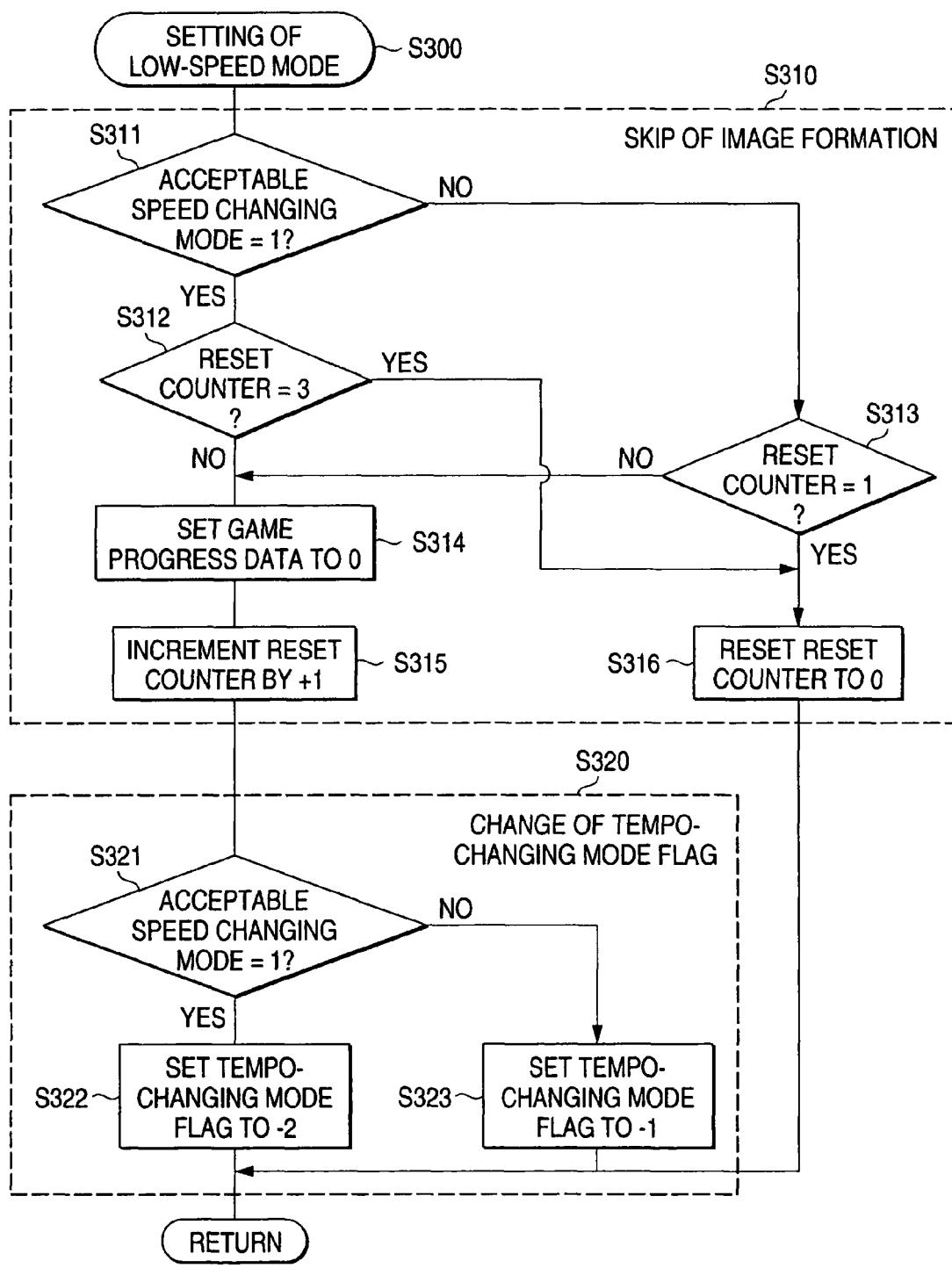
FIG. 10 is a schematic flow chart of a low-speed mode setting to be executed in the game progress/musical tempo determination.

In the low-speed mode setting routine S300, as shown in FIG. 10, an image formation skipping routine S310 and a tempo-changing mode flag routine S320 are sequentially executed. In this embodiment, the period for forming the frame image is elongated in the low-speed mode. Specifically, the formation of the frame image is skipped a predetermined number of times. The image formation skipping S310 is a step for skipping the image formation until the number of skips reaches a target value.

In order to execute the quarter speed, one frame image is formed for a time period to form four frame images. In order to execute the half speed, one frame image is formed for a time period to form two frame images. The reset counter 95 is sequentially set with the counted numbers of vertical synchronizing signals produced during the skips. Therefore, it can be said that the value of the reset counter 95 is counted at the unit of frame period from the time period for which the image formations are skipped.

At the image formation skip S310, more specifically, it is decided at first (at S311) whether the acceptable speed-changing mode bit 94 is at 1 or 0. When the acceptable speed-changing mode bit 94 is at 1, that is, when the quarter speed can be utilized for the frame image to be formed, it is decided (at step S312) whether or not the value of the reset counter 95 (FIG. 6) has already reached the target skip number 3. When the acceptable speed-changing mode bit 94 is at 0, that is, when the half speed can be utilized for the frame image to be formed, it is decided (at step S313) whether or not the value of the reset counter 95 has already reached the target skip number 1.

When it is decided at Decision step S312 or S313 that the value of the reset counter 95 has not reached the target value, the game progress data 93 are reset to 0 (at step S314). When the game progress data 93 have the value 0, the main processing routine S100 is so constructed as to skip the formation of the frame image, as will be described later.

After this, the reset counter 95 is incremented by 1 (at step S315). When it is decided at the decision of step S312 or S313 that the reset counter 95 has already reached the target value, the reset counter 95 is set to 0 (at step S316). At this time, the value of the game progress data 93, as determined at the game progress/musical tempo determination S120, or 1 in this case, is used as-is in the later processing.

Thus, the image formation skip S310 is ended, and the tempo-changing mode flag change S320 is executed. Here, it is decided (at step S321) whether the acceptable speed-changing mode bit 94 is at 1 or 0. When the acceptable speed-changing mode bit 94 is at 1, the quarter speed can be utilized for the frame image to be formed, and the tempo-changing mode flag 84 (FIG. 6) is changed to −2 (at step S322). This value −2 indicates that the musical composition should be played at a quarter of the speed of the ordinary tempo. When the acceptable speed-changing mode bit 94 is at 0, the half speed can be utilized for the frame image to be formed, and the tempo-changing mode flag 84 is changed to −1 (at step S323). This value −1 indicates that the musical tempo should be changed to one half of the ordinary tempo.

In the low-speed mode, as seen from the description thus far made, at step S310 (image formation skip process), the game progress data 93 are set to 0 so that the formation of the frame image may be interrupted until the skip number reaches the skip target value. When the skip number reaches the skip target value, the value is returned to 1, as calculated at step S121 (FIG. 8) in the game progress/musical tempo determination S120. The tempo-changing mode flag 84 is kept at the value −2 (for the quarter speed) or −1 (for the half speed).

Reverting to FIG. 8, when neither the high-speed mode key nor the low-speed mode key is depressed, the tempo-changing mode flag 84 (FIG. 6) is set to 0 (for the ordinary tempo) (at step S126). In this case, this flag has already been set at 0 at the initialization S110, but step S126 is provided for resetting the tempo-changing mode flag 84 to 0 when the formation of a new frame image is started after the end of the high-speed mode or the low-speed mode. Thus, the operations of the game progress/musical tempo determination S120 are ended.

Reverting to FIG. 7, at the main processing routine S100, after execution of the game progress/musical tempo determination S120, it is decided (at step S127) whether or not the game progress data 93 are at 0. This data value 0 occurs when the low-speed mode is instructed by the player, as has already been described. The flow of the main processing routine S100 in this low-speed mode will be described later.

When in the ordinary mode or when the high-speed mode is instructed by the player, the game progress data 93 have the value 1 (in the ordinary mode) or 4 or 2 (in the high-speed mode), as has already been described, after the execution of the game progress/musical tempo determination S120.

When it is decided at step S127 that the game progress data 93 are not at 0, the game is progressed at S130. Here, the progress of the game is controlled. Specifically, the scenes indicating partial flows of the game are switched. In response to the operation input of the player, for example, it is decided whether or not the fight is to be started. When the fight is to be started, the processing therefor is executed, and the scene for the processing is selected.

Here during the execution of the fight, it is decided at the game progress S130 whether or not the player character has been defeated in the fight against the enemy character. If the player character has been defeated in the fight against the enemy character, the main processing routine S100 processes the game-over and is ended. However, the detail of this decision of the defeat of the player character has no relation to the invention so that its detailed description will be omitted. In FIG. 9, on the other hand, the processing for ending the main processing routine S100 at the game-over is not shown for simplicity. At the time of switching the scenes, on the other hand, the value according to the scene is set in the acceptable speed-changing mode bit.

An object action processing routine S140 and a next drawing S150 occupy a main portion of the processing for forming each frame image. At the object action processing S140, of a series of frame images constituting the scene selected at the game processing S130, there are determined the position and the direction of the moved objects contained in the frame image to be subsequently formed.

Figure 11:
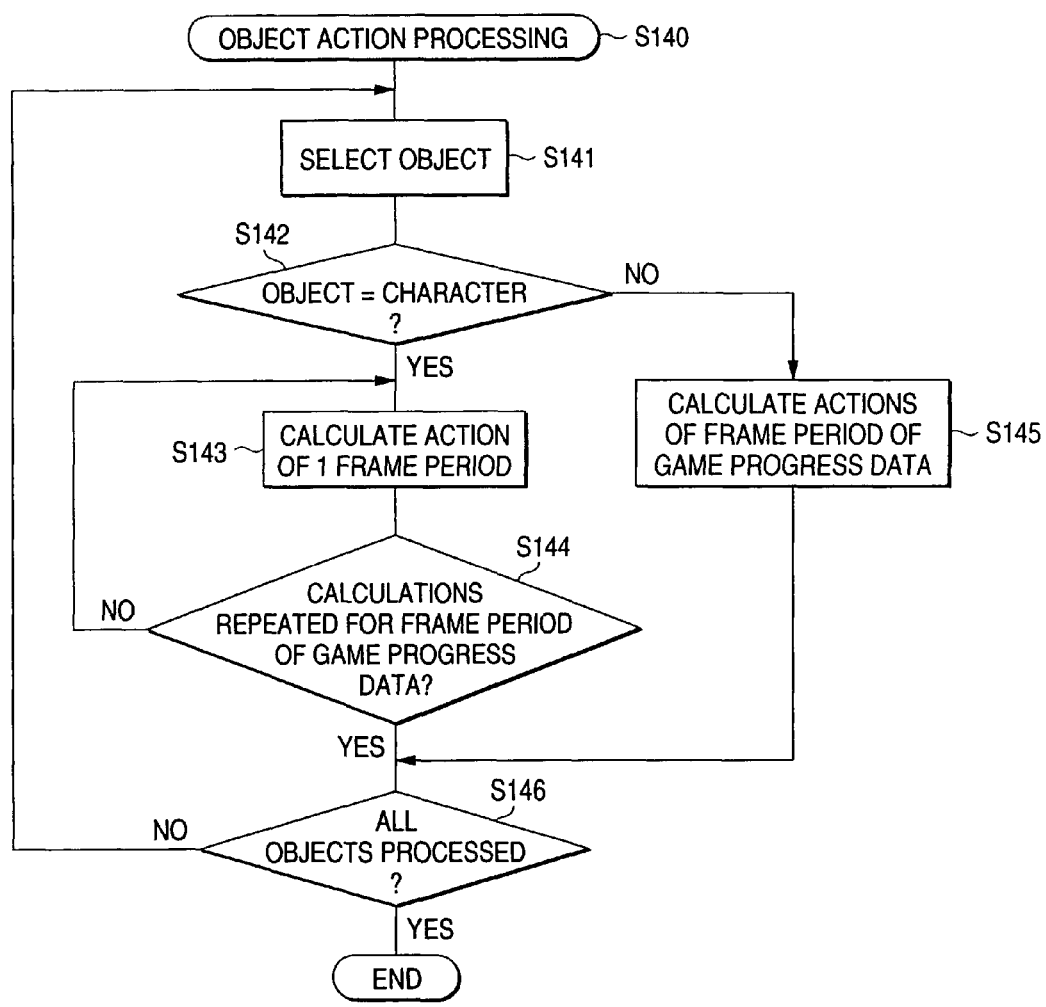
FIG. 11 is a schematic flow chart of an object action processing to be executed in the main processing.

As shown in FIG. 11, more specifically, one of those objects is selected (at step S141), and is discriminated (at step S142) according to a reference present for the object discrimination. Specifically, the selected object is discriminated on whether it is an object of complex motions such as a character object or another object.

If not the character object, the action of the object for the frame periods of the number equal to the value of the game progress data 93 is calculated (at step S145). Specifically, the value indicating the action (i.e., the changes in the movement and direction) of one frame period is multiplied by the value of the game progress data. This result is added to the data indicating the original position and direction of the object. As a result, the positions and directions of the polygons, as constituting the object after lapse of that period, in the individual virtual spaces (or world spaces) are determined to form an object model indicating the object.

In the case of the character object, the object action for one frame period is calculated (at step S143). Specifically, the positions and directions of the polygons, as constituting the character object after lapse of the period, in the individual virtual spaces are determined to form the object model expressing the character object.

Next, it is decided (at step S144) whether or not the calculations of step S143 have been repeated for the frame period indicated by the game progress data. If the calculations for the frame period indicated by the game progress data are not done, the calculation of step S143 is done. If the calculations for the frame period indicated by the game progress data are done, on the other hand, the routine advances to step S144. As a result, the calculations of step S143 are repeated by the value of the game progress data. Thus, there are determined the positions and directions of the individual objects after lapse of the frame period equal to the value of the game progress data.

In the case of the character object, the calculations at S143 are performed for each single frame period because the action of the character may abruptly change for each frame. If the character collides against an obstacle such as a wall after lapse of one frame period, for example, its position and direction then make large changes. Therefore, the action of the character for one frame period is calculated, and these calculations are repeated by the value of the game progress data.

In other words, the decision of step S142 is made to decide whether or not the object should have an action to be calculated for each frame period. If others should change their actions for one frame period like the character, the decision reference could be changed to process the objects like the character.

All objects are decided (at step S146) on whether or not they have been processed. With an object being left unprocessed, the routine advances to step S143. If it is decided that the foregoing processing of all the objects has been ended, the object action processing routine S140 is ended. Thus, the positions and directions of all polygons constituting each object after the frame period of the number indicated by the game progress data 93 was elapsed are determined.

Here in the ordinary mode, the value of the game progress data 93 has been assumed to be at 1 so that the aforementioned step S143 is executed only once. In the high-speed mode, however, the game progress data 93 have the value 4 or 2 so that the calculations of step S143 are repeated by that value. As a result, the position and direction of the object having been subjected to the object action processing routine S140 are identical to those of the object for the frame period preceding by the aforementioned value of the game progress data 93 in the ordinary mode.

Reverting to FIG. 7, in the next drawing step S150, on the basis of the positions and directions determined at the object action processing 140 for all the polygons of the individual objects constituting the frame image to be formed, the image data for displaying those polygons on the screen are made and are sequentially stored in the not-shown frame buffer disposed in the graphic processing unit 104.

The polygons constituting the object model formed for each object are rendered or perspectively converted, and the shapes and positions of the polygons constituting the object model are so determined as to express an object figure to be displayed on the screen of the display apparatus. On the other hand, the object model is texture-mapped to assign colors, patterns and so on to the individual faces of the polygons constituting the object.

Thus, drawing data are made for the polygons constituting that object model. The operations thus far described are sequentially executed on the different polygons constituting one of the objects constituting the screen. Thus, there is formed a frame image expressing all the objects.

The frame buffer disposed in the graphic processing unit 104 (FIG. 1) is composed of a pair of not-shown frame buffers A and B, one of which is sequentially stored with the image data of the objects constituting one frame image formed at the drawing step S150.

After the formation of one frame image was ended, the making of a vertical synchronizing signal by the display apparatus 20 (FIG. 1) is awaited (at step S160). When this vertical synchronizing signal is made, it is decided again (at step S161) whether or not the value of the game progress data 93 is at 0. In the ordinary mode or the high-speed mode, the value of the data is not at 0, so that the frame buffers are switched (at step S170) from one to the other. In other words, the other of the paired frame buffers is selected as one for storing the next frame image. As a result, there is displayed the last frame when the frames of the number determined according to the value set in the game progress data are processed. The graphic processing unit 104 transmits the frame image, as newly stored in the one frame buffer, to the display apparatus 20 and displays it on the screen of the same in synchronism with the vertical synchronizing signal after the formation of the frame image was ended.

In the ordinary mode or the high-speed mode, the operations from the game progress/musical tempo determination S120 to the frame buffer switching step S170 are then repeated to form the succeeding frame images likewise sequentially.

When the game progress/musical tempo determination S120 is repeated, more specifically, the difference between the value of the real-time counter 91 and the value of the image formation starting time data 92 is calculated at step S121, as shown in FIG. 8. This difference expresses the period from the instant when the vertical synchronizing signal just before the formation start of the formed frame image to the instant when the first vertical synchronizing signal is produced after the end of the formation of the frame image, at the unit of frame period. This period can be said to express the formation time period of the formed frame image. Therefore, the aforementioned difference expresses the formation time period of the formed frame image at the frame period unit. This value is assumed in this embodiment to be 1.

This formation time period of the frame image is set as-is in the game progress data 93, as has been described before. These data 93 are employed either as they are or as the data indicating the progress of the next frame image at the formation time of the frame image, after quadrupled or doubled if the high-speed mode key is depressed, in the object action processing routine S140 by the method described before. Moreover, the value of the real-time counter 91 is set in the image formation starting time data 92. These updated data 92 indicate the formation starting time of the next frame image at the frame period unit.

After this, the image data expressing the next frame image are stored like before in the other of the paired frame buffers by the game progressing step S130, the object action processing step S140 and the drawing step S150.

The operations thus far described are executed sequentially on a series of succeeding frame images so that the series of image data expressing the frame images are stored alternately in the paired frame buffers.

In parallel with these formations of new frame images, from the others different from the frame buffers for storing the frame images being formed, there are read out the frame images which are recently stored in the other frame buffers, and these read frame images are displayed by the display apparatus 20. When a group of frame images in sequence have a formation time equal to one frame period, therefore, the display of these frame images are switched for every period. In the ordinary mode, the game progress of those frame images is equal to the value estimated by the game program so that the game progresses on the screen at a progressing speed estimated by the game program.

While the high-speed key is being depressed, however, the game progress of those frame images is determined to be four or two times as long as that estimated by the game program. As a result, only the last frame image when the frame images are formed by the game progress is displayed after one frame period. On the screen, therefore, the game progresses at a speed of four or two times as high as the progressing speed estimated by the game program. Thus, the actions of the ordinary mode or the high-speed mode are realized.

Reverting to FIG. 7, in the low-speed mode, the game progress data 93 are changed to 0 by the game progress/musical tempo determination S120 in the main processing routine S100. After the decision step S127, therefore, the steps from the game progressing step S130 to the drawing step S150 are skipped, and a standby signal for awaiting the production of the vertical synchronizing signal is produced at step 160.

If the vertical synchronizing signal is produced, it is decided again at step S161 whether or not the game progress data 93 are at 0. In this case, the game progress data 93 are at 0 according to the assumption so that the processing returns to the game progress/musical tempo determination S120 without executing the frame buffer switching step S170. Thus, the formations of the frame image are skipped.

Since the frame buffer switching step S170 is not executed, the graphic processing unit 104 (FIG. 1) feeds the display apparatus 20 repeatedly with the frame images which have been displayed, in synchronism with the vertical synchronizing signal so that the frame image being displayed is continuously displayed.

When the target value of the skip numbers is 3, the operations thus far described are repeated three times at each production of the vertical synchronizing signal until the skip number reaches the target value. At each skip, the reset counter 95 is incremented by 1 (at step S315 (FIG. 10)). When the target value of the skip numbers is 1, the skip number reaches the target value when the foregoing operations are once executed.

In any case, when the game progress/musical tempo determination S120 is executed after the skip number reached the target value, the game progress data 93 determined at the step S122 (FIG. 8) of that determination are not reset but employed as the game progress data of the frame image to be made as they are. In this case, this value is at 1. The reset counter 95 is reset to 0 (at step S316 (FIG. 10)).

In this case, at the main processing routine S100, the progressing step S130, the object action processing step S140 and the drawing step S150 are executed after the game progress/musical tempo determination S120, and the production of the vertical synchronizing signal is awaited (at step S160). When the vertical synchronizing signal is produced, the frame buffer switching step S170 is also executed.

Thus, there is formed an image having a new, ordinary game progress. After all, only one frame is produced for the four frame periods or for the two frame periods so that the video game is displayed on the screen of the display apparatus at the game progressing speed of quarter or half the speed of the ordinary game progress speed.

The changes of the frame images formed and displayed by the foregoing steps will be described more specifically by using the time charts of the several signals shown in FIGS. 12 and 13.

In these Figures, reference letters Q1, Q2 and so on indicate examples of the frame images formed at the drawing step S150. The time periods for which the frame images Q1, Q2 and so on are formed are shown to correspond to the frame buffer A or B in which the individual frame images are stored. Numerals, as parenthesized over the periods for which the individual frame images are formed, indicate the values of the game progress data 93 which are employed for forming the frame images.

The periods, for which the individual frame images are displayed on the display apparatus 20, are arrayed on a common line independently of the frame buffers from which the frame images are to be red out. The numerals, as parenthesized over the periods for which the individual frame images are displayed, indicate the values of the game progress data 93 which were used for forming the frame images.

Figure 12:
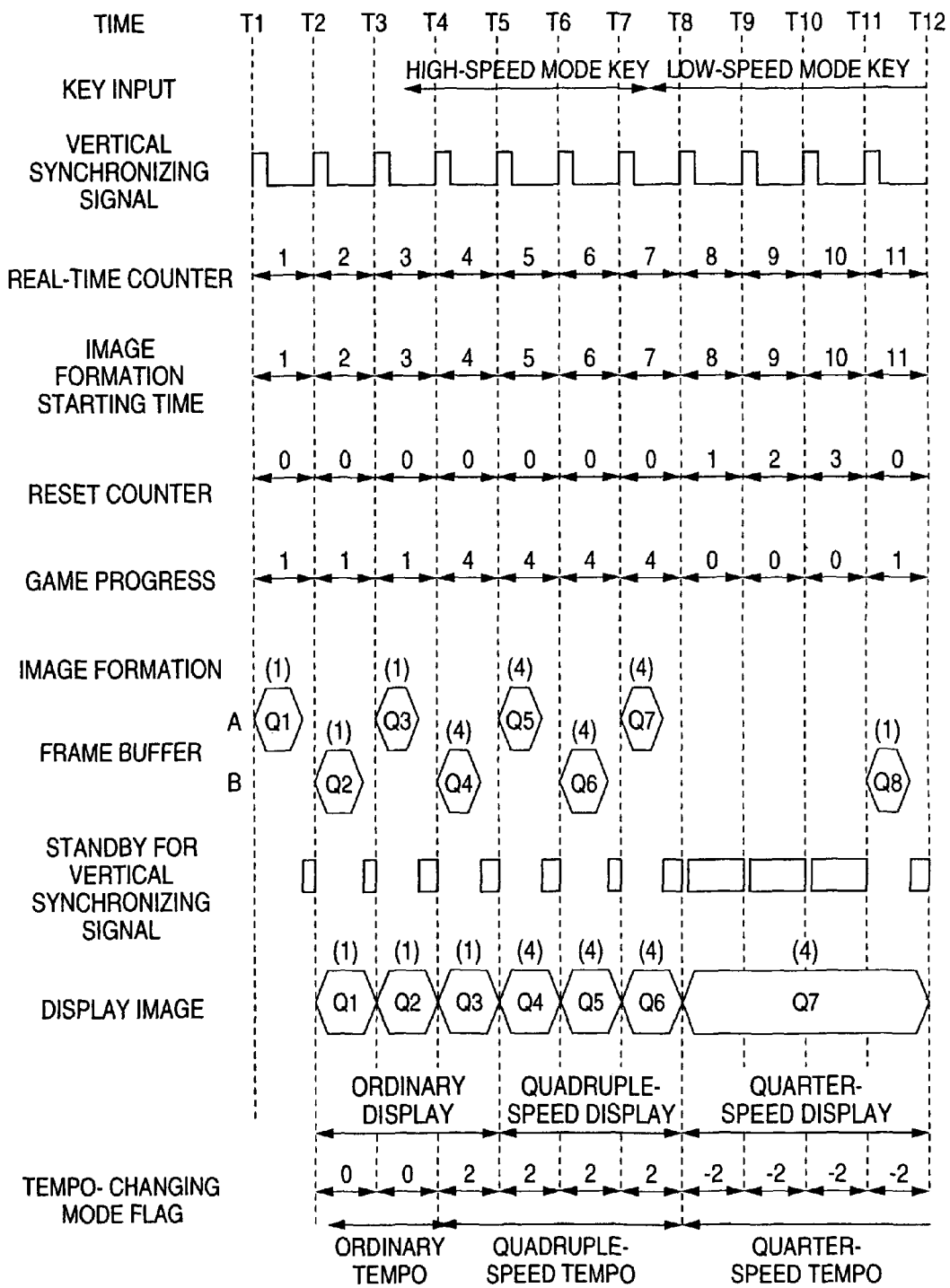
FIG. 12 is a portion of a time chart for explaining the formations and displays of several frame images by the main processing.

In FIG. 12, it is assumed that the image formation starting time data 92 (FIG. 6) are initialized to 0 before time T1 by the initialization S110, and that the real-time counter 91 (FIG. 6) is set to the initial value 1 in response to the vertical synchronizing signal produced at time T1. After this, moreover, the difference between the value 1 of the real-time counter 91 and the value 0 of the image formation starting time data 92 is calculated at the game progress/musical tempo determination S120.

This difference indicates the formation time period of the preceding frame image and takes the value 1 in this case. This value is determined as the initial value of the game progress data 93. In the ordinary mode, the game progress data 93 are used as the game progress data of the frame image to be formed.

After this, the progress of the game is controlled by the game progressing step S130, and the actions of all the objects constituting the first frame image Q1 are calculated in the object action processing step S140 in accordance with the value 1 of the game progress data 93. On the basis of this result, the image data indicating the first frame image Q1 are stored in one frame buffer A by the drawing step S150.

Here, the formation time period of the first frame image Q1 is assumed to be within one frame period. Before time T2 when the next vertical synchronizing signal is produced, therefore, the formation of the frame image Q1 is ended, and the vertical synchronizing signal awaiting signal is set by the vertical synchronizing signal awaiting step S160 (FIG. 7). When the new vertical synchronizing signal is produced at time T2, the frame buffer switching step S170 (FIG. 7) is executed, and the frame buffer for storing the frame image to be subsequently formed is switched into the other frame buffer B.

After this, before the formation of the next frame image Q2, the game progress/musical tempo determination S120 is executed to update both the real-time counter 91 and the image formation starting time data 92 to 2. The game progress data 93 are also updated but to 1 according to the assumption.

Thus, it is decided that the next frame image Q2 is also formed like the frame image Q1 on the basis of the value 1 of the game progress data 93.

Here, it is also assumed that the formation time period of the frame image Q2 is within one frame time period. Therefore, the value of the game progress data 93 for a next frame image Q3 remains at 1. In the following, it is further assumed that the frame image Q3 is likewise formed on the basis of the value 1 of the game progress data 93.

When the vertical synchronizing signal awaiting signal is set individually before times T3 and T4 so that the vertical synchronizing signal is produced individually at times T3 and T4, the real-time counter 91 is sequentially updated to 3 and 4, and the image formation starting time data 92 are also sequentially updated to 3 and 4. The game progress data 93 are also updated at the individual times but remain at 1.

Thus, the frame images Q2 and Q3 are sequentially stored in the frame buffers B and A. At time T2, the formation of the frame image Q1 has been ended so that the frame image Q1 is displayed from time T2. The image Q3 is displayed from time T3. Likewise, the frame Q3 is displayed from time T4.

It is seen from the diagrams that the display switching occurs on the frame images Q1 to Q3 for one frame period. When the frame images having the game progress data 93 at 1 are thus continued, the individual frame images are displayed in the ordinary mode for only one frame period as in the prior art. Therefore, these images display the game at the game progress speed estimated by the game program.

Now, it is assumed that the high-speed mode key is depressed by the player continuously from the midway of times T3 and T4 to the midway of times T7 and T8. The game progress data 93 of a frame image Q4 the formation of which is started from time T4 are quadrupled or doubled by the game progress/musical tempo determination S120, as has been described before. Here, it is assumed that the game progress data 93 is quadrupled to 4.

The frame buffer to be stored with the image Q4 is the frame buffer B. When the drawing step S150 for the frame image Q4 is ended, the vertical synchronizing signal awaiting signal is produced before time T5. When the vertical synchronizing signal is produced at T5, the frame buffers are switched. The game progress data for a next frame image Q5 are likewise changed to 4. The game progress data 93 for succeeding frame images Q5 and Q6 are likewise changed to 4.

Thus, frame images Q4 to Q7 are formed for the period from time T4 to time T7, for which the high-speed mode key is being depressed by the player, to have a game progress increased by four times.

The frame images Q4 to Q7 are stored sequentially in the frame buffers B, A, B and A. At time T5, the formation of the frame image Q4 is ended so that the frame image Q4 is displayed from time T5. The frame image Q5 is displayed from time Q6. Likewise, the frame image Q6 is displayed from time T7. As a result, by these frame images, there are displayed on the screen the images which change at the progressing speed of four times as high as the game progressing speed estimated by the game program.

At time T4 when the vertical synchronizing signal is produced at first after the high-speed mode key was first depressed by the player for the time period between times T3 and T4, the image Q4 to be formed is changed to the image for the high-speed mode and is displayed from time T5 of the next vertical synchronizing signal. As a result, the screen is instantly changed after the player's operation.

On the other hand, it is assumed that the player continues to depress the low-speed mode key in place of the high-speed mode key for the time period midway between times T7 and T8 to times T19 and T20. It is further assumed that the value of the acceptable speed-changing mode bit 94 is 1 so that the quarter-speed action can be used. In the low-speed mode, there is executed the low-speed mode setting step S300 in the game progress/musical tempo determination S120 (FIG. 8). At this step, the game progress data 93 are reset to 0 by the target times by the image formation skipping step S310 (FIG. 10).

For the frame period starting at time T8, more specifically, the reset counter 95 has already been reset to 0. The game progress data 93 for this period are reset to 0. The reset counter is incremented by 1. The game progress data 93 is at 0 so that no image is formed for this frame period. However, the vertical synchronizing signal awaiting signal is produced.

Similar operations are made for the next frame period to start from time T9. Here, the reset counter 95 is incremented by 2. Likewise, for the frame period starting at time T10, the reset counter 95 is incremented by 3.

For the frame period to start from time T11, the reset counter 95 has already taken the value 3 so that the image formations are not skipped. In other words, the value 1 determined at step S122 in the game progress/musical tempo determination S120 is employed as it is as the game progress data. The reset counter 95 is reset to 0 for this frame period. Thus, an image Q8 is formed for the frame period from time T11 and is stored in the frame buffer B so that it is displayed from time T12. The image Q7 is repeatedly displayed until time T12.

Likewise, a next image Q9 is formed by using the game progress data 93 at the value 1 for the time period from time T15 to time T16 in the four frame periods from time T12 to time T16 and is displayed from time T16. The image Q8 is displayed over the four frame periods from time T12 to time T16.

A next image Q10 is formed by using the game progress data 93 at the value 1 for the time period from time T19 to time T20 in the four frame periods from time T16 to time T20 and is displayed from time T20. The image Q9 is displayed over the four frame periods from time T10 to time T20.

Thus, in the low-speed mode, the frame image having the value 1 of the game progress data 93 is formed every four frame periods and is displayed over the four frame periods. Therefore, the game can progress on the screen at a progressing speed of one quarter as high as that of the ordinary mode.

At and after time T8 at which the vertical synchronizing signal is produced at first after the low-speed mode key was depressed by the player for the period from time T7 to time T8, on the other hand, the image Q8 is formed after the four frame periods and is continuously displayed for the four frame periods. As a result, the screen is changed to one for the low speed with a short delay after the keying operation of the player.

It is assumed that the player interrupts the operation of the low-speed mode key midway between time T19 and time T20. In this ordinary mode, the game progress data 93 determined at step S122 in the game progress/musical tempo determination S120 (FIG. 8) are used as they are to form the frame image. For a group of frame periods to start from time T20, more specifically, frame images Q11, Q12, Q13 and Q14 are consecutively formed and are individually displayed after one frame period. As a result, the display in the ordinary mode is realized again.

Figure 13:
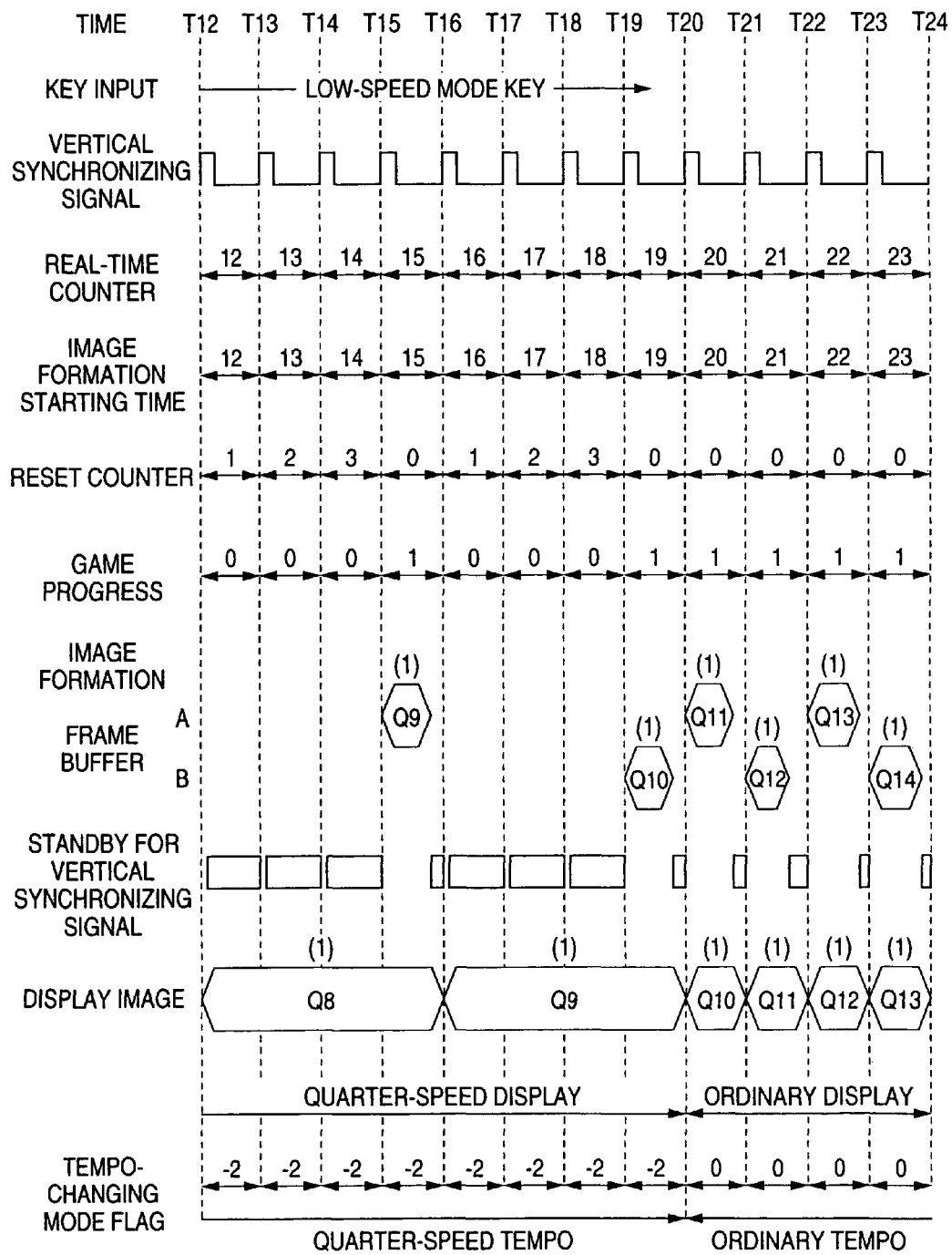
FIG. 13 is the other portion of the time chart.

Here, the pattern of the display of the image at the double speed or at the half speed is apparent from the example of the images at the quadruple speed and the quarter speed so that it is not shown in FIGS. 12 and 13.

Now, in the case of the player's operation shown in FIGS. 12 and 13, the play of a music changes, as will be described in the following. The images Q1 to Q3 are those which are displayed in the ordinary mode. The tempo-changing mode flag 84 takes the value 0 for the period from time T2 to time T4, for which the music is played at the ordinary tempo.

At time T4 when the first vertical synchronizing signal after the high-speed mode key was depressed by the player for the period from time T3 to time T4 is detected, the tempo-changing mode flag 84 is changed to the value for the high-speed mode. In the cases of FIGS. 12 and 13, the acceptable speed-changing mode bit 94 is assumed to be at 1 so that the tempo-changing mode flag 84 is changed to 2. This value is kept until time T8 at which the first vertical synchronizing signal is detected after the low-speed mode key was depressed in place of the high-speed mode key for the period from time T7 to time T8. As a result, the music is played at the high-speed tempo (e.g., at the quadruple tempo) from time T4.

It is at time T5 when the first image Q4 of the quadruple speed is displayed, but the tempo-changing mode flag 84 is changed instantly from time T4, as has been described before. If the game program demands the play of the music in this moment, the music is played at the quadruple speed. For the period from time T5 to T6, there is displayed the image Q4 which was formed in the ordinary mode.

Meanwhile, therefore, the music and the displayed image do not match in the modes, but the period for this discrepancy is one frame period, which raises no serious problem against the player. If the music were changed to the high-speed tempo just after the high-speed mode key was depressed, the player would rather be caused to feel as if the key operation was instantly reflected on the progress of the game.

At time T8 after the low-speed mode key was depressed in place of the high-speed key by the player for the period from time T7 to time T8, the first vertical synchronizing signal is detected, and the tempo-changing mode flag 84 is changed to −2. The music is played at the low-speed tempo (e.g., at the quarter tempo).

After not only the low-speed mode key but also the high-speed mode key were opened for the period between time T19 and time 20, the first vertical synchronizing signal is detected at time T20. Until this time T20, the value of the tempo-changing mode flag 84 is kept at −2. For the period from time T8 to time T20, therefore, the music is played in the low-speed mode, e.g., at the quarter speed in this case.

It is at time T13 that the first image Q8 at the quarter speed is displayed, but the tempo-changing mode flag 84 is changed instantly from time T8, as has been described before. If the game program demands the play of music in this moment, the music is played at a quarter speed.

The image for the quadruple speed is displayed over four periods for the period from time T8 to time T12 so that the game progresses on the screen at the low speed from time T8. As a result, it desirably corresponds to the mode of the displayed image that the tempo-changing mode flag 84 is instantly changed from time T8.

When both the high-speed mode key and the low-speed mode key are opened for the period between time T19 and time T20, the tempo-changing mode flag 84 takes the value 0 from time T20 so that the music is played at the ordinary tempo.

In this embodiment, the change of the play tempo of the music for outputting sound effects is realized in the following manners. In the case of a musical composition expressed by the score shown in FIG. 14, each quarter note is vocalized for 0.5 seconds in the ordinary tempo, as shown in FIG. 15. At the quadruple-speed tempo, each quarter note is vocalized for one quarter period (i.e., 0.125 seconds) of the vocalization time at the ordinary mode. At the double-speed tempo, each quarter note is vocalized for one half period (i.e., 0.25 seconds) of the vocalization time at the ordinary mode. At the half-speed tempo, each quarter note is vocalized for a double period (i.e., 1.0 second) of the vocalization time at the ordinary mode. At the quarter-speed tempo, each quarter note is vocalized for a quadruple period (i.e., 2.0 second) of the vocalization time at the ordinary mode.

FIG. 16 tabulates vocalization times of the quarter note and the eighth node at the various tempos. The remaining notes are also changed in the vocalization times at the ordinary tempo in accordance with the modes. In this embodiment, as will be described later, the standard tempo data at the ordinary tempo are changed according to the values of the tempo-changing mode flag 84 so that the vocalization times may be determined according to the values of the tempo data changed.

The plurality of musical compositions to be used in the video game are individually stored as sound data in advance in a sound data region 103e (FIG. 6) in the RAM 103. An identifier ID1 (81a) is added to the sound data 81. Likewise, identifiers ID2, ID3, - - - , and so on are added to the sound data 82, 83, - - - , and so on, respectively. When the individual sound data are to be used, the corresponding identifiers are designated.

Figure 17:
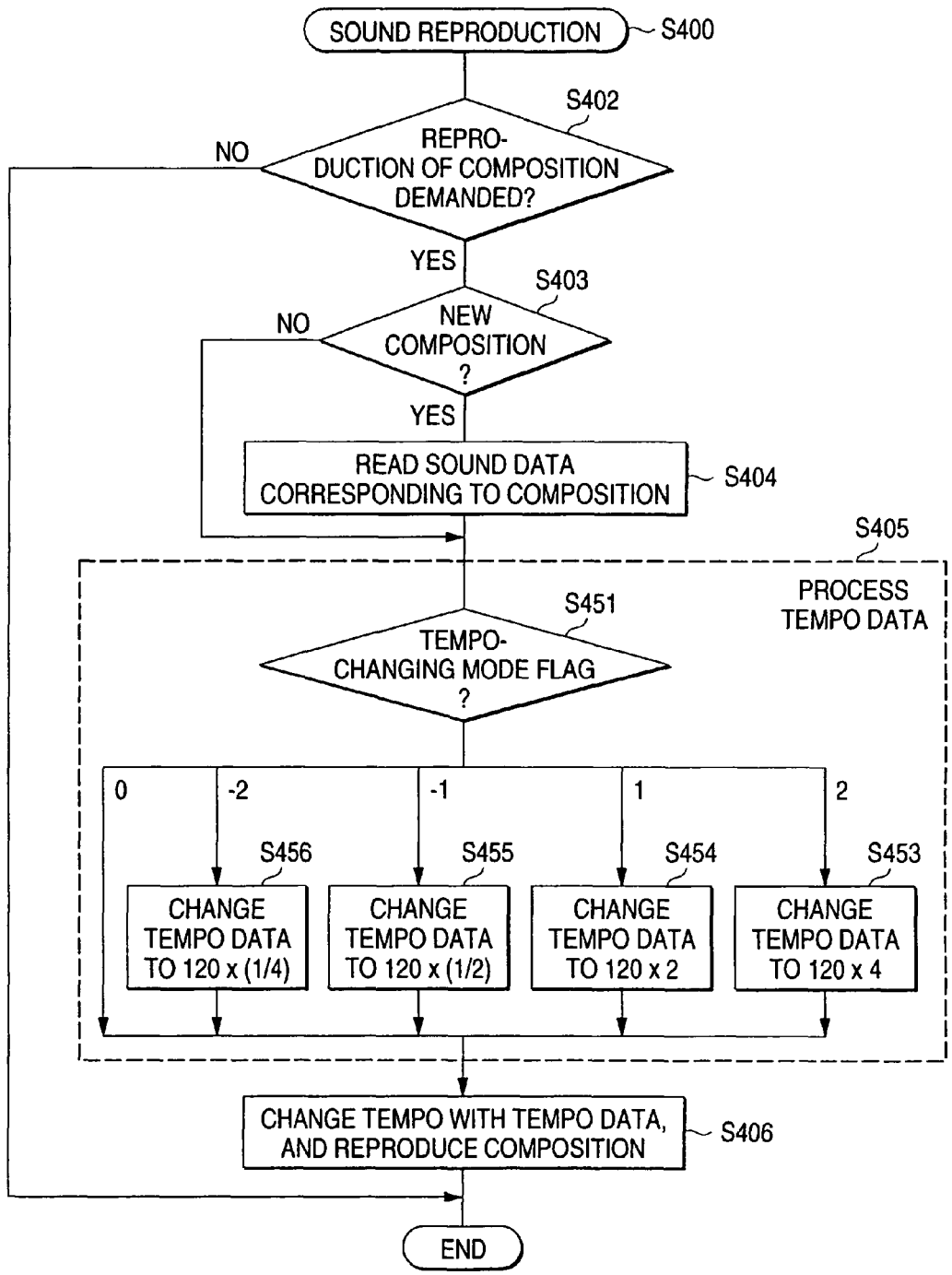
FIG. 17 is a schematic flow chart of a music reproduction in the device of FIG. 1.

When an interruption occurs, there is started a sound reproduction routine S400, as shown in FIG. 17. This routine is started for a constant period even after the main processing routine S100 was started. The interruption for the sound reproduction is made for every constant periods, e.g., at each two hundreds fortieth seconds. When the occurrence of the interruption is detected, the sound reproduction routine is started to decide (at step S402) whether or not the demand of a musical composition is demanded.

This demand for the reproduction of the composition is made at the aforementioned game progressing step S130 (FIG. 7) suitably in accordance with the progress of the game. In the absence of this demand, the routine returns to step S402, at which the occurrence of the interruption is awaited again. In the presence of the demand for the reproduction of the composition, it is decided (at step S403) whether or not the composition designated by the demand is a new one different from the composition being reproduced.

If the demanded composition is different from that being reproduced, the sound data corresponding to the demanded composition are read (at step S404) from the sound data region 103e (FIG. 6) of the RAM 103. If the demanded composition is identical to that being reproduced, the sound data corresponding to that composition and having already being read are used as they are.

Next, the tempo data are processed (in routine S405). In this tempo processing, the standard value of the tempo data is changed according to the value of the tempo-changing mode flag 84 (FIG. 6) to determine new tempo data. The standard value of the tempo data is exemplified by 120 and is used as it is as the tempo data in the ordinary mode.

In this tempo processing routine S405, more specifically, it is decided (at step S451) whether or not the value of the tempo-changing mode flag 84 is at 0 (or the ordinary mode). If this value is 0, no processing is made. If the value of the tempo-changing mode flag 84 is not 0, it is decided (at step S451) which of 2, 1, −2 and −1 the value is.

Next, when the value of the tempo-changing mode flag 84 is at 2, the tempo data 120 is multiplied by 4 for the quadruple speed (at step S453) so that the value 480 is obtained as the tempo data. When the value of the tempo-changing mode flag 84 is at 1, the tempo data 120 is multiplied by 2 for the double speed (at step S454) so that the value 240 is obtained as the tempo data. When the value of the tempo-changing mode flag 84 is at −1, on the other hand, the tempo data 120 is multiplied by ½ for the half speed (at step S455) so that the value 60 is obtained as the tempo data. When the value of the tempo-changing mode flag 84 is at −2, the tempo data 120 is multiplied by ¼ for the quarter speed (at step S456) so that the value 30 is obtained as the tempo data.

After the tempo data processing routine (at step S405), on the basis of the new tempo data obtained, the tempo is changed, and the read sound data are reproduced, so that the demanded composition is reproduced (at step S406). Specifically, each of the vocalization times t of the notes contained in the sound data is changed according to the following Formula (1):

$$t = \text{Vocalization Time in Ordinary Tempo} \times (120/\text{Tempo Data}) \quad (1).$$

The vocalization times of the several notes are tabulated for the various modes in FIG. 16.

Embodiment 2 of the Invention

In the first embodiment, it has been assumed that the formation time period of each frame image is one frame period. However, the method disclosed in the first embodiment can also be applied to a video game in which the formation time period of each frame image is over multiple frame periods such as two frame periods or three frame periods.

When the formation time period of each frame image is two frame periods, for example, these two frame periods are required for forming each frame image so that the switching of the display in the display apparatus 20 occurs substantially every two periods. If the game progress of each game progress is twice as long as the game progress estimated by the game program, therefore, the game progress of each frame image the progressing speed of the game on the screen is identical to that estimated by the game program.

When the formation time period of each frame image is two frame periods, the game progress data, as detected at step S121 in the aforementioned game progress/musical tempo determination S120 (FIG. 8), takes the value 2. According to the foregoing embodiment, in the ordinary mode, the game progress of each frame image is 2. In the ordinary mode, therefore, the progressing speed of the game on the screen is equal to that estimated by the game program. Thus, even when the formation time period of each frame image is two frame periods, the foregoing embodiment can be employed as it is in the ordinary mode.

In the high-speed mode, the game progress of each frame image may be a product of the value at the ordinary time and the increasing rate of the progressing speed. In order to realize the quadruple speed, for example, the game progress of each frame image may be eight times as high as that estimated by the video game.

In the game progress/musical tempo determination S120 having been described in the first embodiment, when the formation time period of each frame image is two frame periods, the game progress of the frame image to be formed is changed to 8 at step S202 in the high-speed mode setting routine 200. When the formation time period of each frame image is two frame periods, therefore, even in the high-speed mode, the first embodiment can be employed as it is including that high-speed mode setting routine 200.

When the formation time period of each frame image is two frame periods, in order to realize the low-speed mode, the number of times of skipping the image formations may be three or one as in the case in which the formation time period of each frame image is one frame period. However, the formation time period of one frame image is two frame periods, and the reset counter 95 is incremented in proportion to the number of the vertical synchronizing signals in the skipping operation so that the target value of the reset counter 95 at step S312 or S313 (FIG. 10) has to be twice as large as the value 3 or 1 in the first embodiment.

After all, the target value of the reset counter 95 may be determined in dependence upon the value of the frame formation time period, as detected at step S121 in the game progress/musical tempo determination S120.

When the acceptable speed-changing mode bit 94 is at 1 in the image formation skipping step 310 (FIG. 10) so that the quarter speed can be used, more specifically, the skip target value to be compared at step S312 with the value of the reset counter 95 may be given by the following Formula:

$$\text{Skip Target Value} = \text{Frame Image Forming Time Period} \times 3 \quad (2).$$

When the acceptable speed-changing mode bit 94 is at 0 so that the half speed can be employed, the skip target value to be compared at step S313 with the value of the reset counter 95 may be given by the following Formula:

$$\text{Skip Target Value} = \text{Frame Image Forming Time Period} \times 1 \quad (3).$$

In either Formula, the formation time period of the frame image employs the value which is expressed at the unit of the frame period.

In this embodiment, the first embodiment is thus changed and employed. In other words, this embodiment is different from the first embodiment only in the setting of the aforementioned skip target value. In this embodiment, the low-speed mode can be employed even when the formation time period of each frame image is two frame periods.

Figure 18:
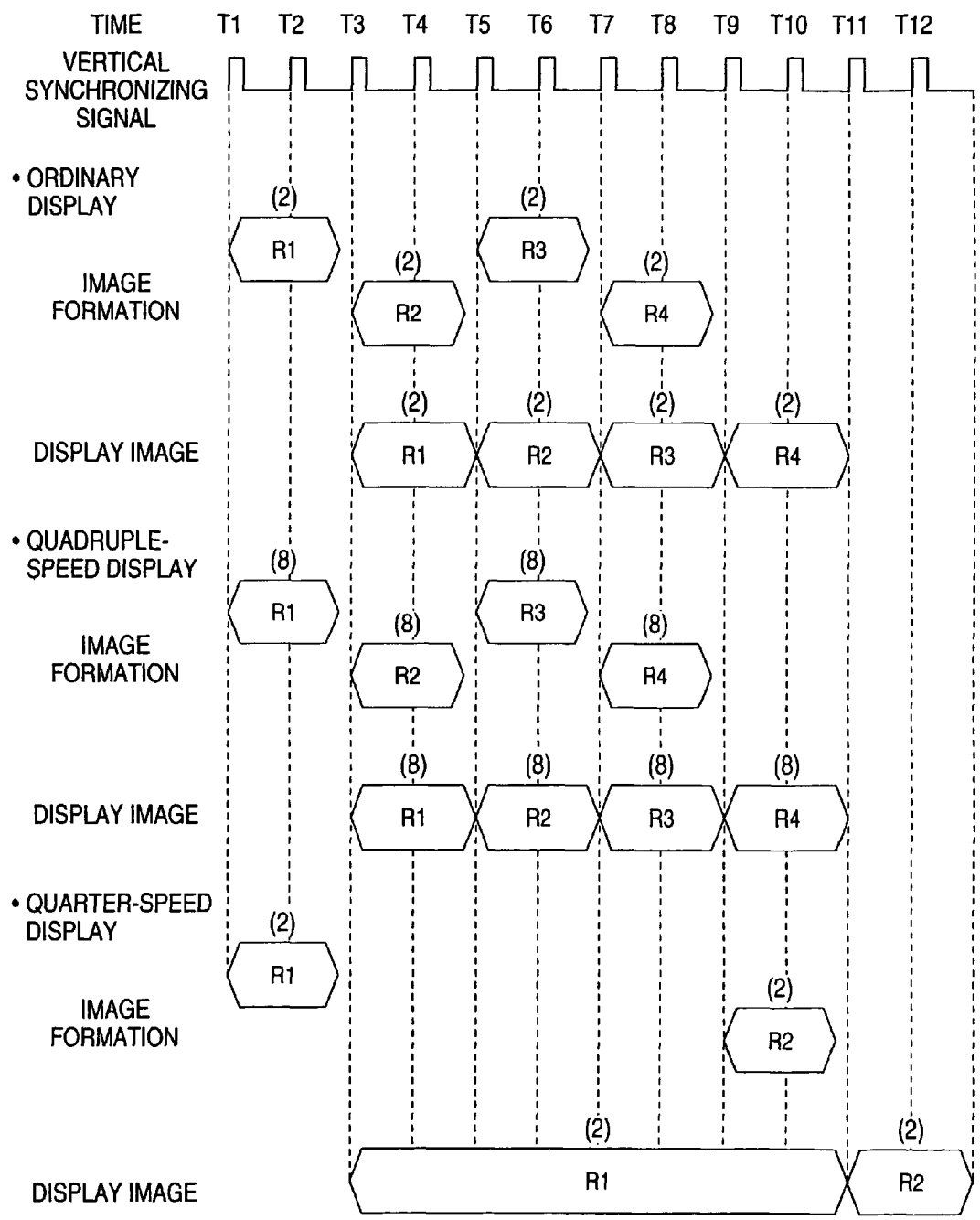
FIG. 18 is a schematic time chart for explaining the formations and displays of several frame images when the time period for forming the frame images by the main processing is a two-frame period.

Specifically, there are exemplified in FIG. 18 the formations and the display changes of the frame image having the formation time period of two frame periods. Here is sequentially formed the frame image R1 or R4. The formation time period of each frame image is assumed to be the two frame periods.

The time period for each frame image to be formed is described to correspond to one of the paired frame buffers to be stored with the frame image. The numerals, as parenthesized over the periods for which the individual frame images are formed, indicate the values of the game progresses of the frame images. The numerals indicating the individual frame images are arrayed on a common line. The numerals, as parenthesized over the periods for which the individual frame images are displayed, indicate the values of the game progresses of the frame images.

As seen from FIG. 18, in the ordinary mode, if the frame images are formed by using the game progress twice as high as that per frame period, as estimated by the video game, the game progressing speed expressed by the series of frame images displayed is the ordinary progressing speed estimated by the video game.

In the high-speed mode, in the case of the quadruple speed, if the frame images are formed by using the game progress of four times as high as that used in the ordinary mode (hence, the game progress of eight times as high as the game progress estimated by the video game), the game progressing speed expressed by the series frame images displayed is four times as high as that estimated by the video game.

In the low-speed mode, in the case of the quarter speed, if the frame images are formed for every eight frame periods by using the game progress of four times as high as that used in the ordinary mode (hence, the game progress of two times as high as the game progress estimated by the video game), as it is, the game progressing speed expressed by the frame image series displayed is one quarter as high as that estimated by the video game.

As apparent from the description made thus far, this embodiment can also be applied to the case in which forming time period of each frame image takes another value such as the three frame periods. It is, therefore, found that this embodiment can also be applied to the case in the formation time period of each frame image is 1, 2, 3 or more frame periods.

As having already been described, the image formation starting time data 92 to be used at step S121 (FIG. 8) indicate the formation starting time of the frame image which was formed just before the frame image to be subsequently formed. Therefore, the difference calculated at step S121 expresses the formation time period of the immediately preceding frame image at the frame period unit. In the first and second embodiments, it is assumed that the formation time periods of the consecutive frame images are equal if metered at the frame period unit.

At step S122, therefore, the formation time period of the immediately preceding frame image is employed as it is as the formation time period of the frame image to be subsequently formed, and the value of the game progress of the frame image to be subsequently formed is equalized to the formation time period of the frame image.

As a result, even if the formation time period of the frame image is any of one to three frame periods or another frame period, as has been described in this embodiment, it is possible to form the frame image which displays the game at the progressing speed estimated by the program in the ordinary mode.

In the high-speed mode, moreover, the product between the game progress of the frame image thus determined and the speed increasing rate is used as the game progress of the frame image to be formed so that the game can be progressed at the speed of the same times independently of the formation time period of the frame image.

In the low-speed mode, moreover, if the number of times to skip the image formation in accordance with the foregoing Formula 2 or 3 is determined on the basis of the value of the game progress data 93 determined at step S122, the game can be progressed at the same speed reducing rate independently of the formation time period of the frame image.

Embodiment 3 of the Invention

The second embodiment can also be applied to the case in which the formation time periods of the individual frame images constituting the video game take the value of one frame period or another (e.g., greater) number of frame periods, if sequential formation time periods are equal to each other.

It is the object action processing step S140 and the drawing step S150, as have already been described, that highly dominate the formation time period of the frame image. If the number of objects contained in the frame images even in the same game changes, the total number of polygons to be processed by those steps so that the formation time periods of the frame images highly change among the frame images.

In the case of the frame image containing about three characters, for example, the image forming time period may reach three frame periods. In case the number of characters contained in the frame image is one, on the other hand, the image forming time period may be one frame period. It frequently happens that the frame images required to have different formation time periods are contained in the same game.

For this video game, therefore, it is desired that the game progressing speed can be changed according to the operation of the player. However, the second embodiment can be employed in the video game in which frame images of different formation time periods are included.

In such a video game, too, many consecutive frame images are generally formed for the same time period. Specifically, these frame images include a series of frame images having an image forming time period of one frame period, and a series of frame images having an image forming time period of two frame periods.

Considering such a video game, at step S122 (FIG. 8), the formation time period, as metered at step S121, of the immediately preceding frame image is employed as a value for estimating the formation time period of the frame image to be subsequently formed, and the game progress of the next frame image is deemed to be equal to the value for estimating the formation time period of the frame image to be subsequently formed.

For the series of frame images having the same formation time period, the predicted values of the formation time periods of the individual frame images are correct. The second embodiment can be applied to the case in which the formation time periods of the individual frame images is the one frame period or another (e.g., greater) number of frame periods. Therefore, the second embodiment can realize the ordinary mode, the high-speed mode and the low-speed mode correctly for the aforementioned series of frame images.

In the ordinary mode, more specifically, the predicted value at the unit of the frame period of the formation time period of the frame image to be subsequently formed is used as the game progress of the frame image. As a result, there is formed the frame image for displaying the game in the ordinary mode independently of the formation time period of the frame image.

More specifically, the period for each frame image to be displayed depends upon the formation period of the next frame image. In other words, the display of each frame image is started from the instant when the vertical synchronizing signal is produced after the end of the formation of the frame image, and is finished when the vertical synchronizing signal is produced after the formation of the next frame image. In short, each frame image is displayed while the next frame image is being produced. It is, therefore, desired that the game progress of each frame image is determined on the basis of the predicted value of the formation time period of the next frame image.

However, it can be deduced that each frame image, the frame image just before (preceding frame image) and the next frame image are usually formed for the same formation time period. Therefore, it can be considered that the formation time period of the frame image just before each frame image is not only the predicted value of the formation time period of the frame image but also the predicted time period of the next frame image. In this embodiment, therefore, it can be said not only that the game progress of each frame image is determined by using the predicted value of the formation time period of the frame image but also that the game progress of the frame image is determined by using the predicted value of the formation time period of the next frame image.

In the high-speed mode, the product between the predicted value of the formation time period of the frame image to be subsequently formed and the speed multiplier (double, quadruple) is the game progress of the frame image. As a result, the frame image for displaying the game at a speed of multiple times is formed independently of the formation time period of the frame image.

In the low-speed mode, moreover, the formations of the frame images are skipped by a number of times equal to the product between the predicted value of the formation time period of the frame image to be subsequently formed and the numeral (e.g., 3 or 1) depending upon the speed "divisor" (quarter or half). As a result, the frame image for displaying the gate at the same low speed independently of the formation time period of the frame image.

Thus, in the second embodiment, it is found that the predicted value of the formation time period of the frame image to be subsequently formed is effectively employed.

Here, when the formation time period of the preceding frame image and the formation time period of the succeeding adjacent frame image are different, the predicted value is incorrect on the formation time period of the succeeding frame image. For this succeeding frame image, therefore, the aforementioned three modes are not precisely realized, but the period for the frame image to be displayed is over several frame periods at most so that the player is not especially troubled.

Therefore, the second embodiment can also be applied to the video game in which the frame images of different formation time periods are included. Here, the second embodiment could be so modified as to reduce the influences of the frame images having the aforementioned incorrect predicted value.

Embodiment 4 of the Invention

The fourth embodiment is different from the foregoing embodiments in the method of determining the number of frames (or the game progress extend) to be processed at the frame image forming time. In the foregoing Embodiments 1, 2, and 3, when each frame image is formed, its formation time period is metered. Moreover, the formation time period metered is used for determining the frame number to be processed at the time of forming a next frame image. In the fourth embodiment, on the other hand, the time period for forming the frame image is estimated on the basis of the processing time deemed necessary for forming the frame image. Then, the predicted formation time period is used to determine the number of frames to be processed at the time of forming the next frame image.

Specifically, the methods of the foregoing Embodiments 1, 2, and 3 make use of the fact that the formation time periods in the frame period units of the actually consecutive frame images are frequently equal. As a matter of fact, however, the formation time periods of the frame images temporarily change. For the formation time period of the preceding frame image, therefore, the succeeding frame image cannot always be formed. In the Embodiment 4, therefore, the processing time at the frame image forming time is calculated in advance to determine the game progress according to the processing time.

As has already been described, the formation time period of the frame image is the time period necessary for making the image data of a group of objects contained in the frame image. Therefore, it is also possible to use a method for predicting the processing time to form the images of all objects on the basis of the total number of polygons constituting the objects.

The processing time for forming the frame image depends highly on the number of objects contained in the frame image and the total number of the polygons constituting the individual objects. Between the game processing step S130 and the object action processing step S140 described already, therefore, the total number of the polygons of the objects to be used for forming a next frame image may be evaluated, and it is then decided whether or not the individual polygons or the individual objects will move, so that the operation for predicting the processing time (i.e., the amount of required processing) for forming the frame image on the basis of the counting result and the decided result may be made.

The limit value of the processing time for forming the frame image within one frame period is predetermined, and the ratio between the predicted processing time and the limit value is calculated, so that the calculated result can be used as the formation time period of the frame image at the unit of the frame period.

The processing of Embodiment 4 will be described with reference to FIGS. 19 and 20. Step numbers in FIGS. 19 and 20 are similar to those of FIGS. 7 and 8, respectively, for the operations similar to those of Embodiment 1.

Figure 19:
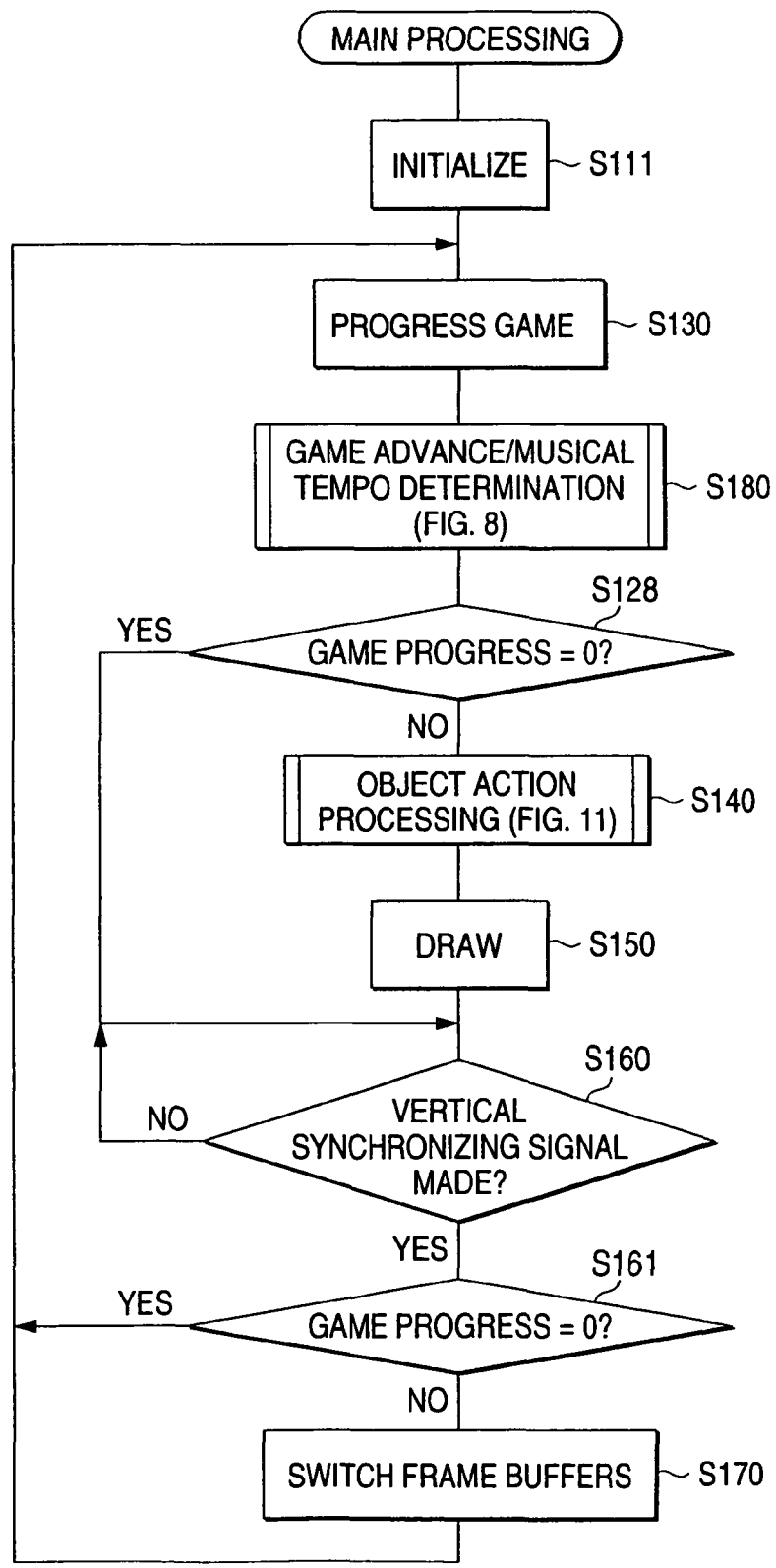
FIG. 19 is a schematic flow chart of a variation of the main processing of a game program to be suitably executed in the game device.
Figure 20:
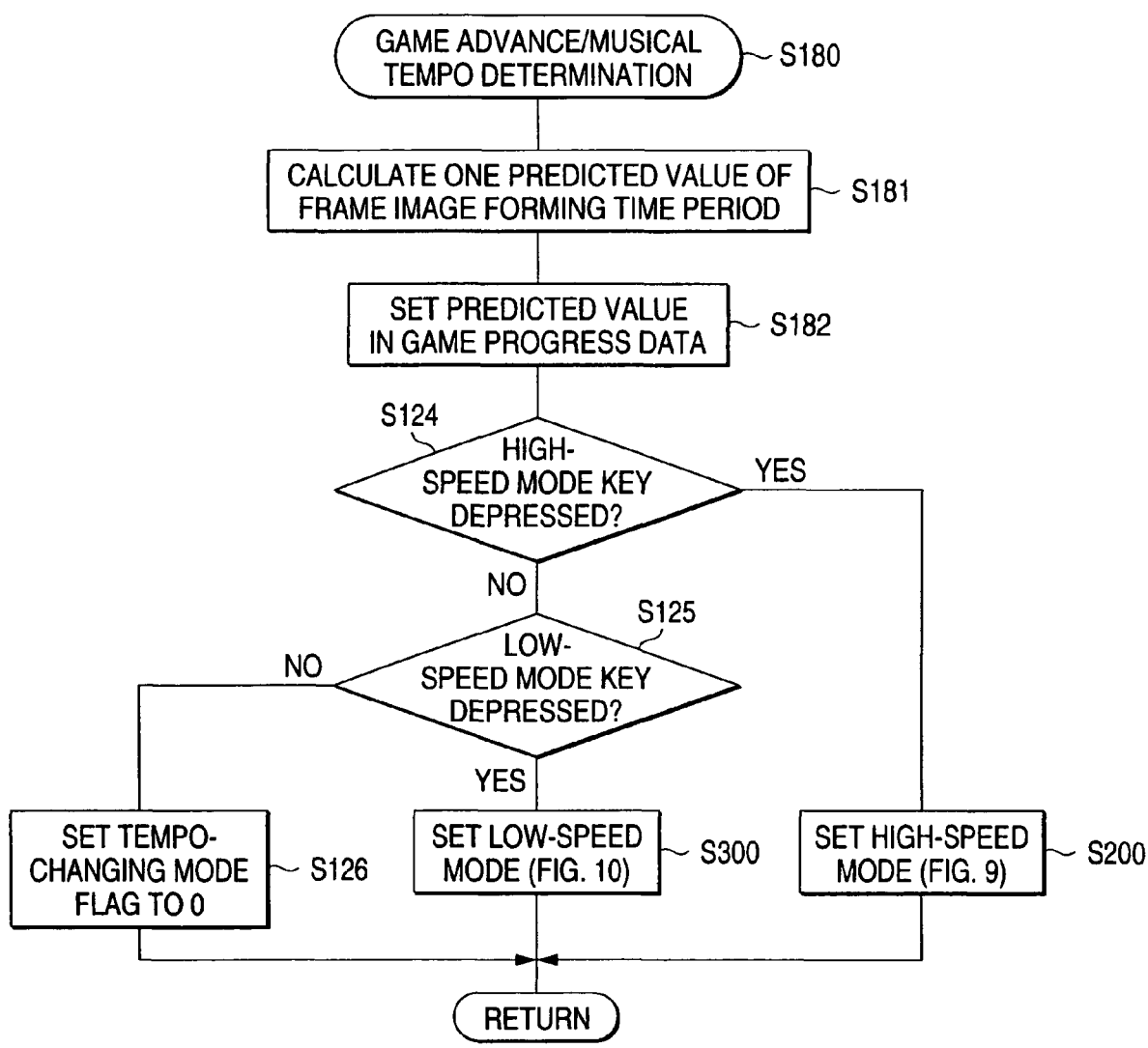
FIG. 20 is a schematic flow chart of a variation of the game progress/a musical tempo determination contained in the main processing.

FIG. 19 is a flow chart showing a main processing of the game progress in Embodiment 4. After the start of the main processing, an initialization is executed at first (at step S111). At the initialization, the tempo-changing mode flag 84 (as shown in FIG. 6) is set to 0. The value 0 of the tempo-changing mode flag 84 indicates that a musical composition should be played at an ordinary tempo. On the other hand, the acceptable speed-changing mode bit 94 (FIG. 6) is set to 1. This value 1 of the acceptable speed-changing mode bit 94 indicates that the game can be progressed at quadruple speed and one quarter speed. On the other hand, the game progress data 93 (as shown in FIG. 6) are set to 1. This value 1 of the game progress data 93 indicates that the frame image of one frame is formed for one frame time period.

After the end of the initialization, the game is progressed (at step S130). In this game progress, the moving direction or the like of the character is determined in response to the operation input of the player. After the end of the game progress, the game progress/musical tempo determination is executed (at step S180). In this game progress/musical tempo determination, the game progressing time and the musical tempo are determined according to the total number of polygons to be displayed and the operation input. The determination of the game progress/musical tempo in the fourth embodiment will be described in detail.

After the end of the determinations of the game progress/musical tempo, it is decided (at step S128) whether or not the game progress data are at 0. If the game progress data are at 0 (on the YES route of step S128), the routine transfers to step S160. If the value of the game progress data is other than 0 (on the NO route of step S128), on the contrary, an object action processing is executed (at step S140). The detail of this processing is similar to that of Embodiment 1, as shown in FIG. 11. Next, each object is drawn (at step S150). After the end of drawing the object, it is decided (at step S160) whether or not the vertical synchronizing signal has been made.

If the vertical synchronizing signal is not produced (on the NO route of step S160), the operation of step S160 is repeated. If the vertical synchronizing signal is produced (on the YES route of step S160), it is decided (at step S161) whether or not the value of the game progress data is at 0. If the value of the game progress data is at 0 (on the YES route of step S161), the routine transfers to step S130. If the value of the game progress data is other than 0 (on the NO route of step S161), the frame buffers are switched (at step S170). After the switching of the frame buffers, the routine transfers to step S130.

Here will be described the detail of the game progress/musical tempo determination in the fourth embodiment. FIG.

20 is a flow chart showing the game progress/musical tempo determinations in the fourth embodiment. This processing is executed after the game progressing (at step S130) in the main routine of the game.

In the game progress/musical tempo determinations, the predicted value of the forming time period for forming a frame image next is calculated at first (at step S181). For example, there is calculated the total number of polygons of objects to be used for forming the frame image next. Moreover, the calculated total number of polygons is divided by the number of polygons to be displayed per one preset frame period (the remainder is carried). The result of this division becomes the predicted value of the time period for forming the frame image. This predicted value is a prediction how many times of the frame period is required for forming the next frame image.

The calculated predicted value is set in the game progress data (at step S182). After this, it is decided (at step S124) whether or not the high-speed mode key is depressed. If the high-speed mode key is depressed (on the YES route of step S124), the high-speed mode is set (at step S200). The detail of the high-speed mode setting is similar to that of Embodiment 1, as shown in FIG. 9. After the end of the high-speed mode setting, the routine advances to step S128 of the main processing (as shown in FIG. 19).

If the high-speed mode key is not depressed (on the NO route of step S124), it is decided (at step S125) whether or not the low-speed mode key is depressed. If the low-speed mode key is depressed (on the YES route of step S125), the low-speed mode is set (at step S300). The detail of this low-speed mode setting is similar to that of Embodiment 1, as shown in FIG. 10. After the end of the low-speed setting, the routine advances to step S128 of the main processing (as shown in FIG. 19).

If the low-speed mode key is not depressed (on the NO route of step S125), the tempo-changing mode flag is set to 0 (at step S126). After this, the routine advances to step S128 of the main processing (as shown in FIG. 19).

The predicted value is set to the game progress data, as has been described hereinbefore, it is determined according to the predicted value what frame after the frame image is to be displayed at the display timing of the next frame image. Specifically, the number of frames (or the game progressing time) to be processed at the time of forming the frame image is determined according to the progressing time based on the polygon number at the frame image forming time.

When the formation time period of the immediately preceding frame image is used as the predicted value of the formation time period of the next frame image, as has already been described in connection with Embodiment 1, the predicted value may be different from the actual formation time period of the frame image. As a result, when those frame images are displayed on the screen, the game progressing speed expressed by the frame images is different from that estimated by the game program.

In embodiment 4, the formation time period of each frame image is predicted on the basis of the content of the frame image. The calculation of the predicted value is performed to make the predicted value larger than the value of the actual frame image forming time period so that the formation of the frame image can be prevented from taking a longer time than estimated. As a result, it is possible to eliminate the change in the game progressing speed, as might otherwise be caused by the failure of the prediction.

Figure 21A:
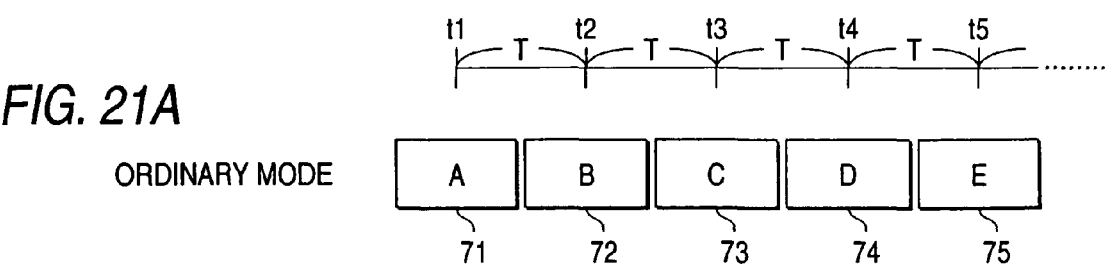
FIGS. 21A, 21B and 21C are diagrams showing the changes in the images displayed in an ordinary mode, in a high-speed mode and in a low-speed mode, respectively.
Figure 21B:
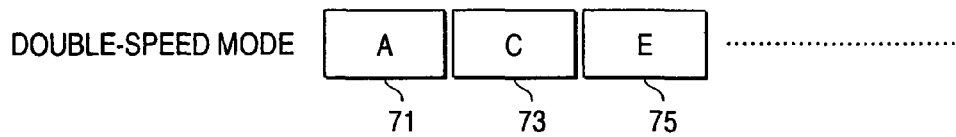
Figure 21C:
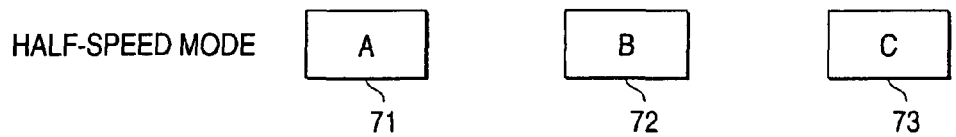

In FIGS. 21A, 21B and 21C, there are illustrated examples of the changes in the screens, as displayed in the foregoing several embodiments. In these Figures, letter T (T is a positive real numeral) indicates the frame period, and images 71, 72, 73, 74 and 75 are schematic images which are formed for one frame period and displayed sequentially by switching them for the individual frame periods in the ordinary mode. In FIGS. 21A, 21B and 21C, the individual images are indicated by "A", "B", "C", "D" and "E". As a matter of fact, however, the images displayed are game images containing characters and so on.

In the ordinary mode, when the image 71 of "A" is formed and displayed at time t1, the image 72 of "B" is formed in parallel with the display of the image 71, and at time t2 after the image 71 was displayed for one frame period, the image 72 of "B" is displayed. Likewise, the image 73 of "C", the image 74 of "D", the image 75 of "E" are consecutively displayed for one frame period.

In the double-speed mode, on the other hand, the image 71 of "A" is formed and is displayed at time t1. When a next image is formed from time t1 in parallel with the display of the image 71, the game progress is so determined that the image 73 of "C" to be intrinsically displayed two frames before in the ordinary mode is formed. At time t2 after lapse of one frame period from time t1, therefore, the image 73 of "C" is displayed. Likewise, the image 75 of "E" is displayed at time t3. Thus, the changing speed of the letter images on the screen is two times as high as that of the ordinary mode.

In the half-speed mode, on the contrary, for the one period to start from time t1 when the image 71 of "A" was displayed, the game progress is at 0, and the formation of the next image is skipped. At time t2, therefore, no new image is displayed, but the image 71 of "A" is continuously displayed. From time t2, the image to be subsequently displayed is formed. In this case, the enlarged image 72 of "B" is formed and displayed from time t3. Thus, at two frame periods after time t1 when the enlarged image 71 of "A" was displayed, the next enlarged image 72 of "B" is displayed. Likewise, at time t5 when two frame periods have elapsed after the display of the enlarged image 72 of "B", the enlarged image 73 of "C" is displayed. Thus, the changing speed of the letter images on the screen is one half as high as that of the ordinary mode.

In the foregoing several embodiments, as apparent from the description made thus far, the high-speed mode is realized by changing not the formation period of the series of frame images but the game progress of the frame images in response to the operation of the player at the time of forming the frame images. Moreover, the low-speed mode is realized by skipping the formation[s] of the frame images. As a result, the progressing speed different from the ordinary one can be realized at the timing preferred by the player and in quick response to the operation of the player. Moreover, the various game progressing speeds can be realized independently of the value of the formation time period of the individual frame images.

Here, the invention should not be limited to the four embodiments thus far described but could naturally be suitably corrected or modified in the embodiments without departing from the gist thereof.

In the four embodiments, for example, in the low-speed mode, there are repeated the operations in which the image formation is skipped a predetermined number of times and in which one frame image is then formed. However, the sequence of the skipping and forming operations may be reversed so that one frame image is formed and the image formation is then skipped by the predetermined number of times.

According to the method for skipping the image formation to realize the low-speed mode, the switching period of the image to be displayed is elongated so that the flicker of the image accordingly increases. This method can be replaced by a method in which the game progress of each image is reduced without skipping the image formation.

In the case of the frame image having the formation time period of two frame periods, for example, when the frame image is to be displayed in the ordinary mode, it may be given a game movement twice as large as the game progress estimated by the game program, as has been described in connection with the second embodiment.

In order to reduce the game progressing speed for realizing such frame image to one half of that in the ordinary mode, the formation period of the frame image need not be changed if the game progress of each frame image is reduced to one half of that in the ordinary mode. In short, the game progress may be equalized to that estimated by the program.

Thus, the method for realizing the low-speed mode by reducing the game progress of the frame image to be formed without any skipping can be applied to the case in which the formation time period is different from two frame periods and in which the speed increasing rate is different from one half. When the formation time period is one frame period and when the speed increasing rate is one quarter, for example, the game progress of each frame image may be set to one quarter of the ordinary game progress.

In the first and second embodiments, therefore, if the quadrupling operation and the doubling operation for the quadruple speed and the double speed are changed into a quartering operation and a halving operation, the quarter speed and the half speed can be realized by the same method as that for realizing the quadruple speed and the double speed. On the other hand, the features and effects on the quadruple speed and the double speed are also retained on the quarter speed and the half speed. These discussions are likewise applied to the speeds other than the quarter and half speeds.

It is natural that one of the aforementioned quadruple speed and half speed may be omitted. Likewise, one of the quarter speed and the half speed may be omitted. As in the embodiments, however, it is desired for the player that the speeds are automatically changed in response to the screen to be formed.

On the other hand, the times of the speed may be different from those of the embodiments. The quadruple speed may be replaced by a higher speed such as a quintuple speed. Likewise, the double speed may be replaced by a higher speed such as a triple speed.

Likewise, the quarter speed may be replaced by a lower speed such as a one-fifth speed. Likewise, the half speed may be replaced by a lower speed such as a one-third speed.

In the foregoing embodiments, on the other hand, when the game is progressed at a low speed, the game progress data are held at "0" for a constant period. By another method, however, the main processing routine may be interrupted for a constant time period. In the low-speed mode setting routine shown in FIG. 10, for example, the tempo-changing mode flag change S320 is executed without operating the game progress data, and the input of the vertical synchronizing signals of a constant time is then awaited. In this meantime, the main processing routine is stopped.

If the acceptable changing mode is at 1, one production of the new vertical synchronizing signal is awaited, and the operation of step S127 (FIG. 7) of the main processing routine is started when the vertical synchronizing signal is produced. If the acceptable changing mode is at 2, on the other hand, three productions of the new vertical synchronizing signal is awaited, and the operation of step S127 (FIG. 7) of the main processing routine is started when the third vertical synchronizing signal is produced. In this case, the operations of step S127 and step S161 are not required.

Thus, as in the first embodiment, each object is enabled to act at a lower speed than that intended by the program.

In the foregoing embodiments, the value of the acceptable speed-changing mode bit 94 is determined according to the kind of the image to be formed by the game program. Without any decision of the player on the kind of the game screen, therefore, a proper speed is automatically determined. This is convenient for the player.

The value of the acceptable speed-changing mode bit 94 may be changed by another method. For example, this value may be changed according to the scene to which the frame image to be formed belongs. Alternatively, the value may be determined with another reference. For example, the value may be determined according to the number of characters to appear in the frame image. Alternatively, the value may be determined in dependence upon the presence or absence of the character in the frame image.

As the case may be, the player may designate the value of the acceptable speed-changing mode bit. There may be provided a key for the player to designate the value. Without using the acceptable speed-changing mode bit 94, moreover, a group of keys corresponding to different speeds may be prepared as the high-speed mode keys.

In the embodiments, the formation time period of each frame image is metered by counting the number of the vertical synchronizing signals to be produced while the frame image is being formed. However, there can be used another clock signal contained in the computer. In this case, it is generally necessary to determine the ratio between the formation time period of each frame image and one frame period.

The computer constructing the game device thus far exemplified in the foregoing embodiments of the invention may be provided with a logic circuit for executing a partial function of the game program used therein. Moreover, this game program may be accordingly changed to change the method for executing the functions used therein.

In the foregoing embodiments of the invention, the input device and the display apparatus are provided separately from the game device. However, the input device and/or the display apparatus may be integrated with the game device. Moreover, the recording medium to be used in the game device may be assembled not removably but fixedly in the game device.

The recording medium according to the invention or the recording medium to be used in the game device according to the invention should not be limited to the CD-ROM but may be any medium that can be read by the computer, such as a DVD, a magnetic recording medium, a semiconductor memory or another optical recording medium.

In the foregoing embodiments, the household game device is used as the platform, but the game device according to the invention may be realized by using a general-purpose computer such as a personal computer or an arcade game machine as the platform. On the other hand, the game device may also be realized by using a communication terminal such as a mobile telephone, a mobile information terminal or a car navigation system as the platform.

According to the invention, the game progressing speed of the video game, as displayed on the screen, can be changed according to the operation of the player.

What is claimed is:

1. A non-transitory computer readable recording medium having a program recorded for a video game to be executed by a computer, wherein the program comprises:

forming frame images constituting the video game sequentially;

displaying the formed frame images by switching the frame images from a frame buffer;

predicting formation time periods of the frame images when the frame images are individually formed;

determining game progress to be made by the frame images, in dependence upon the formation time periods of the frame images, as predicted; and changing the determined game progress, in response to an operation input by a player, wherein a rate of tempo of game music and a rate of formation of the frame images and the determined game progress are increased, when the player inputs a first predetermined instruction, and wherein the rate of tempo of the game music and the rate of formation of the frame images and the determined game progress are decreased, when the player inputs a second predetermined instruction.

2. The non-transitory computer readable recording medium according to claim 1, wherein the predicted formation time periods of the frame images are expressed in units of a frame image display period of a shortest period of switching a display of the frame images.

3. A non-transitory computer readable recording medium having a program recorded for a video game to be executed by a computer, wherein the program comprises:

forming frame images constituting the video game, sequentially in synchronism with ends of formations of individually preceding frame images;

displaying the formed frame images, such that the formed frame images are switched from a frame buffer and displayed after one of the formations of the individually preceding frame images ends in synchronism with a predetermined clock signal having a frame image display period of a shortest time period for switching a display of the frame images;

predicting formation time periods of the frame images when the frame images are individually formed;

determining game progress to be made by the frame images, in dependence upon the predicted formation time periods; and changing the determined game progress in response to an operation input by a player, wherein a rate of tempo of game music and a rate of formation of the frame images and the determined game progress are increased, when the player inputs a first predetermined instruction, and wherein the rate of tempo of the game music and the rate of formation of the frame images and the determined game progress are decreased, when the player inputs a second predetermined instruction.

4. The non-transitory computer readable recording medium according to claim 3, wherein the forming starts a formation of a next frame image after one of the formations of each of the individually preceding frame images ends in synchronism with the predetermined clock signal.

5. A game display method, comprising:

sequentially forming, with a graphics processor, frame images constituting a video game;

displaying, on a display screen, the formed frame images by switching the frame images from a frame buffer;

predicting, with a central processor, formation time periods of the frame images when the frame images are individually formed;

determining, with the central processor, game progress of the frame images, based upon predicted formation time periods of the frame images; and changing, with the central processor, the determined game progress, in response to a player operation input by a player, wherein a rate of tempo of game music and a rate of formation of the frame images and the determined game progress are increased, when the player inputs a first predetermined instruction, and wherein the rate of tempo of the game music and the rate of formation of the frame images and the determined game progress are decreased, when the player inputs a second predetermined instruction.

6. The method according to claim 5, wherein the predicted formation time periods are expressed in units of a frame image display period comprising a shortest period of switching a display of the frame images.

7. A game display method, comprising:

sequentially forming, with a graphics processor, frame images constituting a video game, each of the frame images being formed in synchronism with an end of a formation of a preceding frame image;

displaying, on a display screen, the formed frame images, such that the frame images are switched from a frame buffer and displayed after the formation of the preceding frame image ends in synchronism with a predetermined clock signal having a frame image display period of a shortest time period for switching a display of the frame images;

predicting, with a central processor, a formation time period of each of the frame images when the frame images are formed;

determining, with the central processor, game progress of each of the frame images, based upon the predicted formation time period; and changing, with the central processor, the determined game progress in response to an operation input by a player, wherein a rate of tempo of game music and a rate of formation of the frame images and the determined game progress are increased, when the player inputs a first predetermined instruction, and wherein the rate of tempo of the game music and the rate of formation of the frame images and the determined game progress are decreased, when the player inputs a second predetermined instruction.

8. The method according to claim 7, wherein the sequentially forming further comprises starting a formation of a next frame image after the end of the formation of the preceding frame image in synchronism with the predetermined clock signal.

* * * * *